(12) United States Patent
Masuo

(10) Patent No.: US 12,086,429 B2
(45) Date of Patent: Sep. 10, 2024

(54) MEMORY SYSTEM AND CONTROLLING METHOD

(71) Applicant: Kioxia Corporation, Tokyo (JP)

(72) Inventor: Yoko Masuo, Iruma Saitama (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/120,733

(22) Filed: Mar. 13, 2023

(65) Prior Publication Data

US 2023/0376223 A1    Nov. 23, 2023

(30) Foreign Application Priority Data

May 17, 2022    (JP) .................. 2022-080916

(51) Int. Cl.
*G06F 3/06*        (2006.01)

(52) U.S. Cl.
CPC .......... *G06F 3/0625* (2013.01); *G06F 3/0634* (2013.01); *G06F 3/064* (2013.01); *G06F 3/0659* (2013.01); *G06F 3/0679* (2013.01)

(58) Field of Classification Search
CPC ...... G06F 3/0625; G06F 3/0634; G06F 3/064; G06F 3/0659; G06F 3/0679; G06F 11/0727; G06F 11/073; G06F 11/076; G06F 3/0613; G06F 3/0653; G06F 3/0655; G06F 11/004

See application file for complete search history.

(56) References Cited

U.S. PATENT DOCUMENTS

| | | | |
|---|---|---|---|
| 10,795,589 B2 | 10/2020 | Masakawa | |
| 2013/0173972 A1* | 7/2013 | Kubo | G11C 16/00 714/E11.159 |
| 2021/0064532 A1* | 3/2021 | Park | G06F 12/0851 |
| 2021/0157921 A1 | 5/2021 | Brown et al. | |

FOREIGN PATENT DOCUMENTS

JP    2019-057340 A    4/2019

\* cited by examiner

*Primary Examiner* — Tasnima Matin
(74) *Attorney, Agent, or Firm* — Maier & Maier, PLLC

(57) ABSTRACT

According to one embodiment, the controller periodically executes a first operation. The controller selects a first mode or a second mode in the first operation. In a case where the first mode is selected, the controller reads pieces of data that are stored in contiguous memory locations, respectively, that are included in a first physical page or a second physical page. The first physical page is included in a first physical block of a first die. The second physical page is included in a second physical block of a second die. In a case where the second mode is selected, the controller reads first data stored in one memory location of the first physical page and second data stored in one memory location of the second physical page.

16 Claims, 14 Drawing Sheets

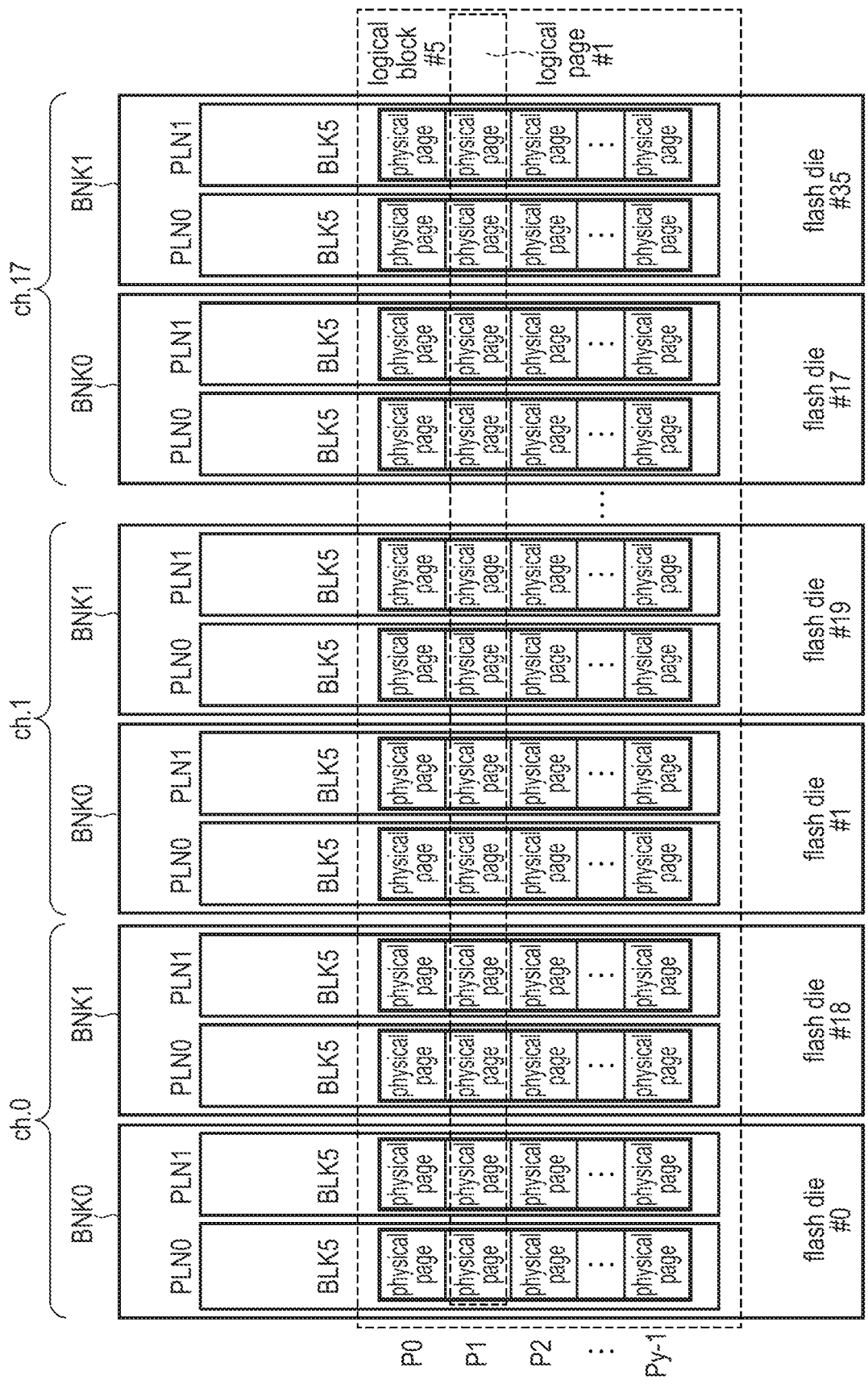
F I G. 3

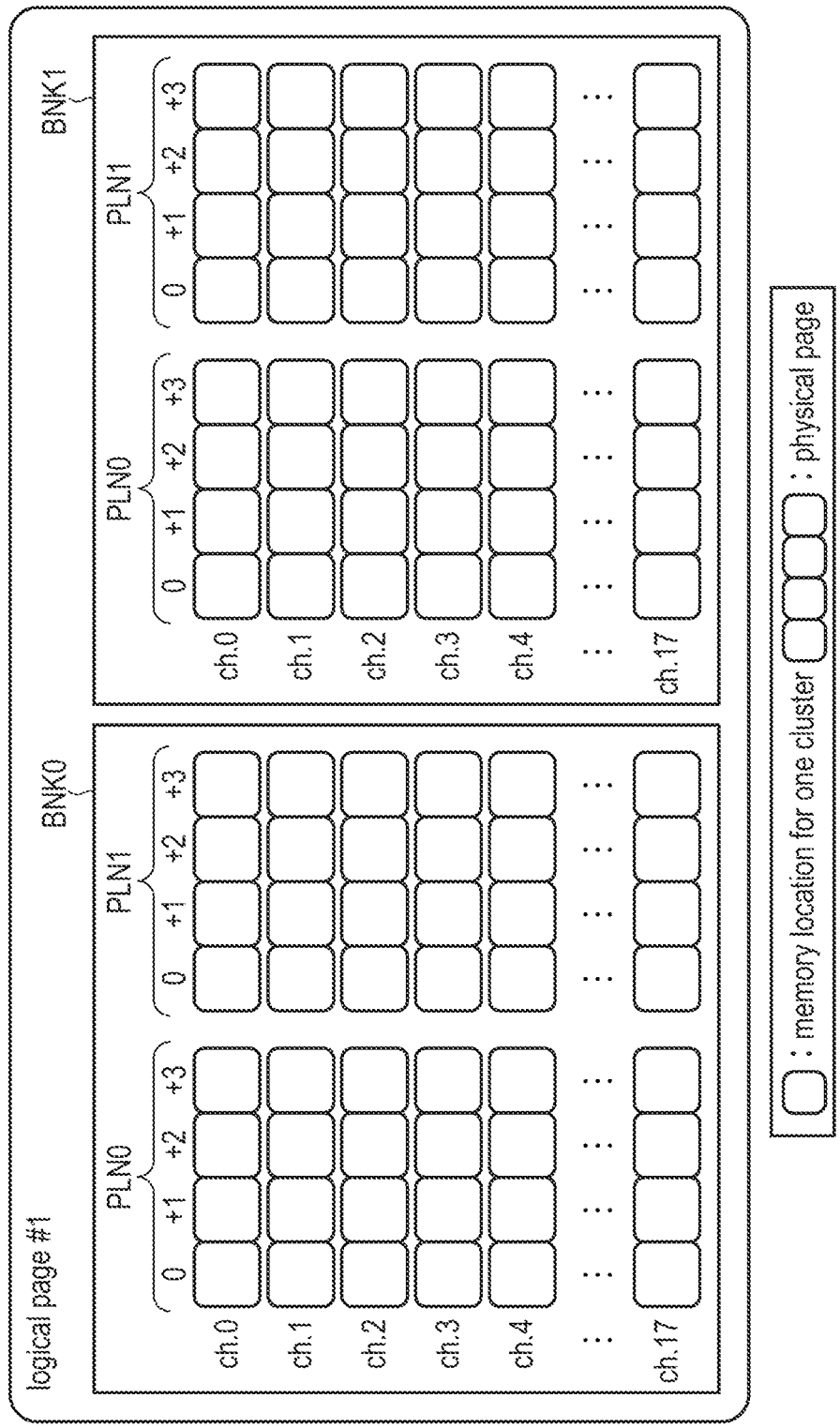
F I G. 4

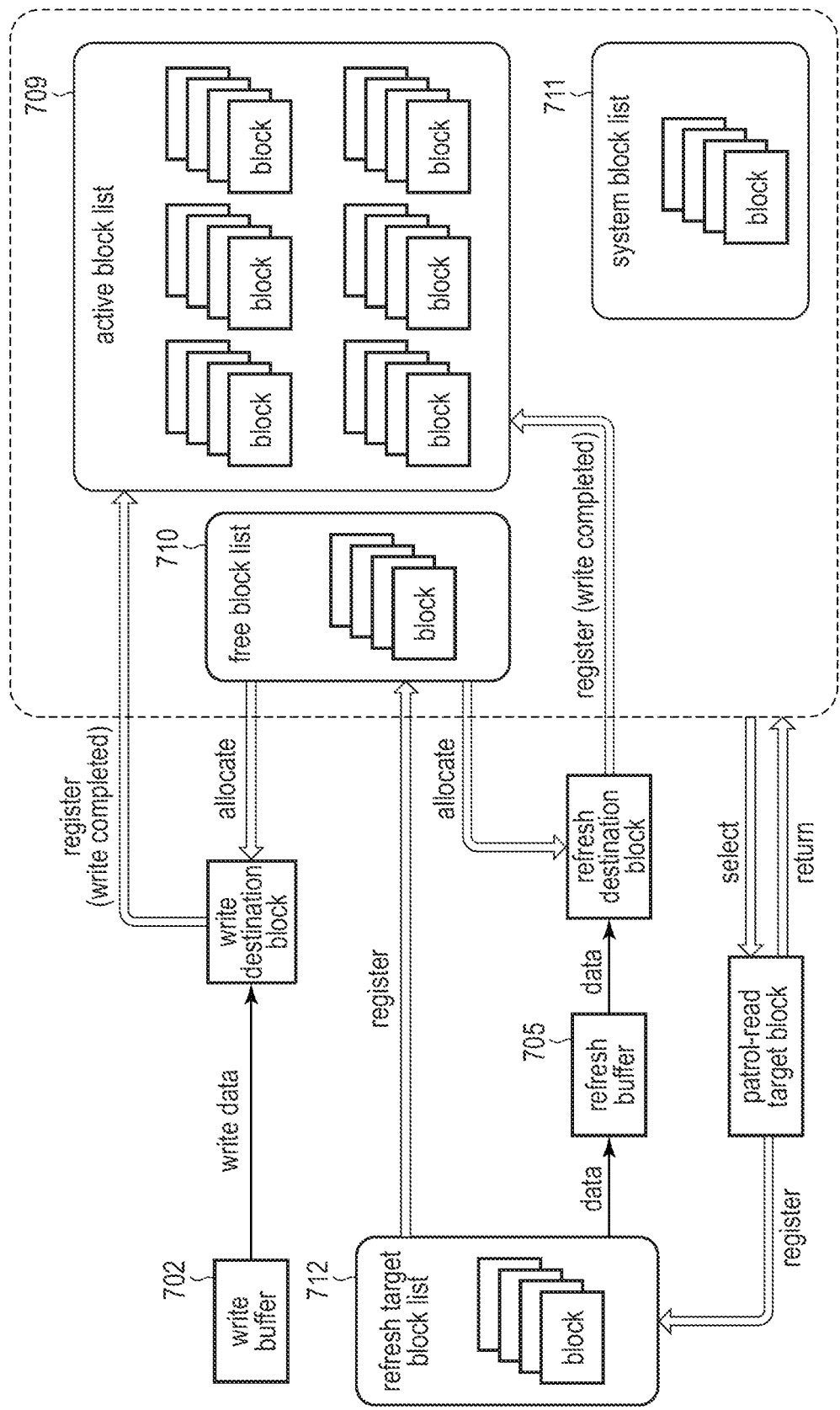
F I G. 5

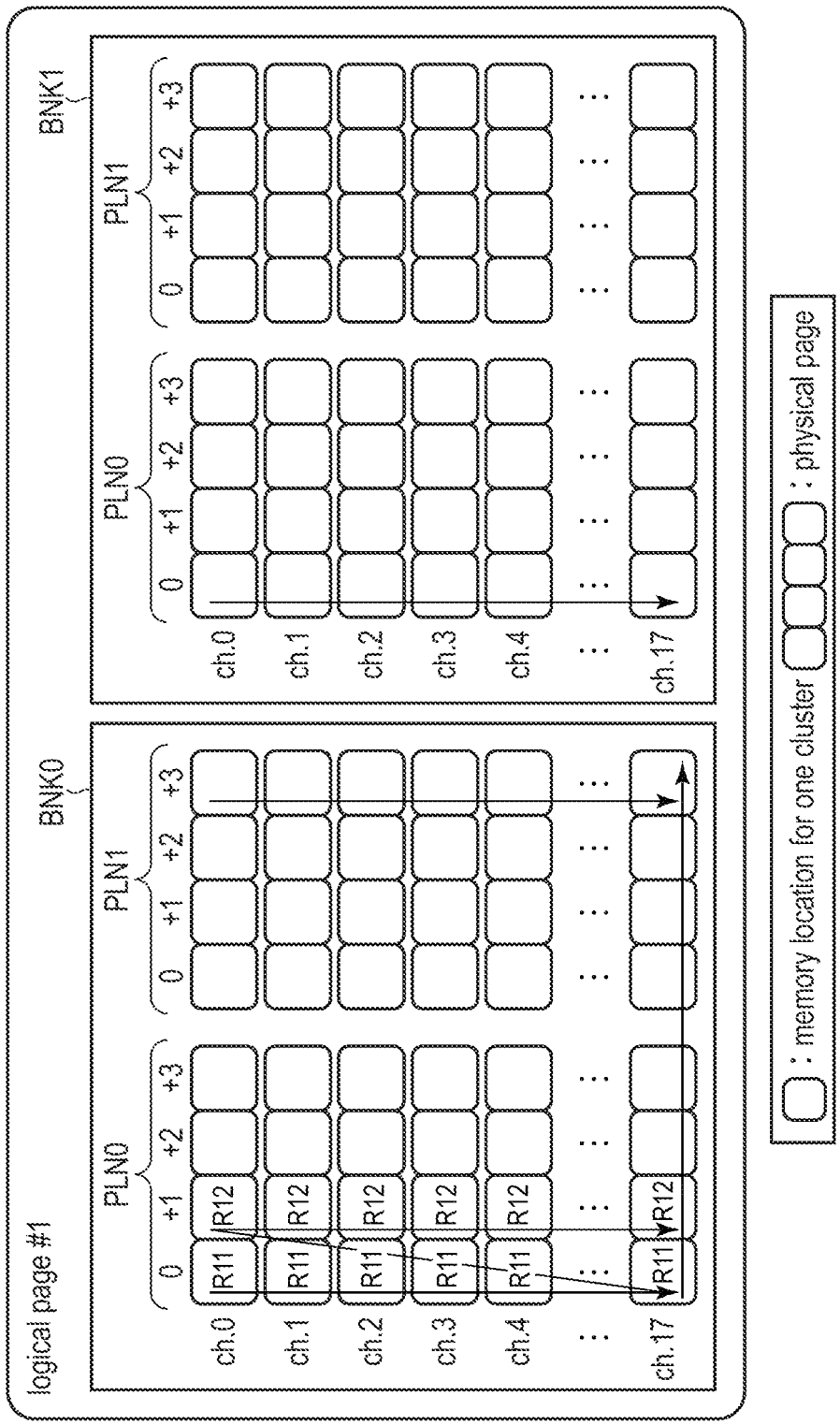
F I G. 7

FIG. 8

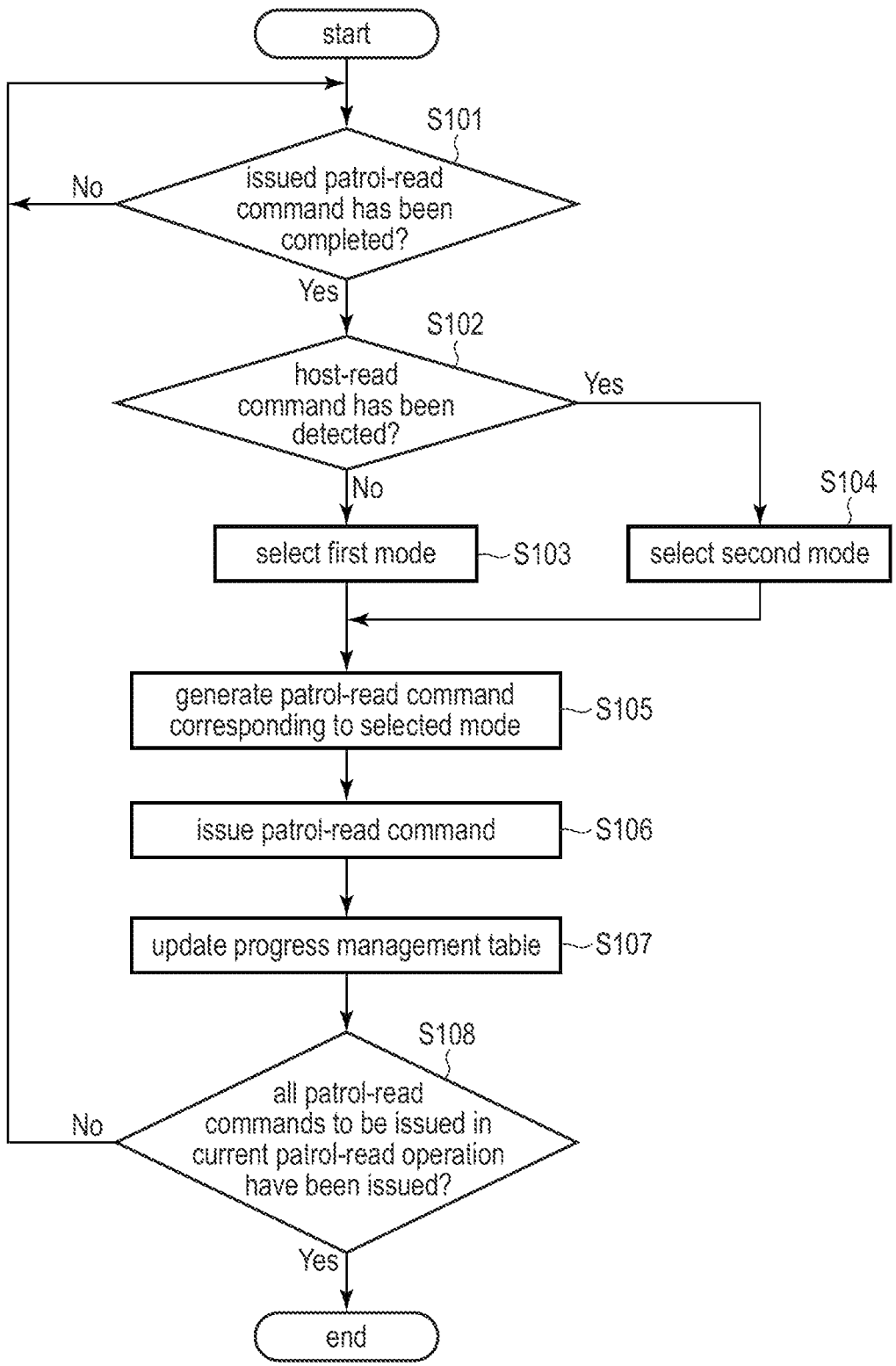
F I G. 9

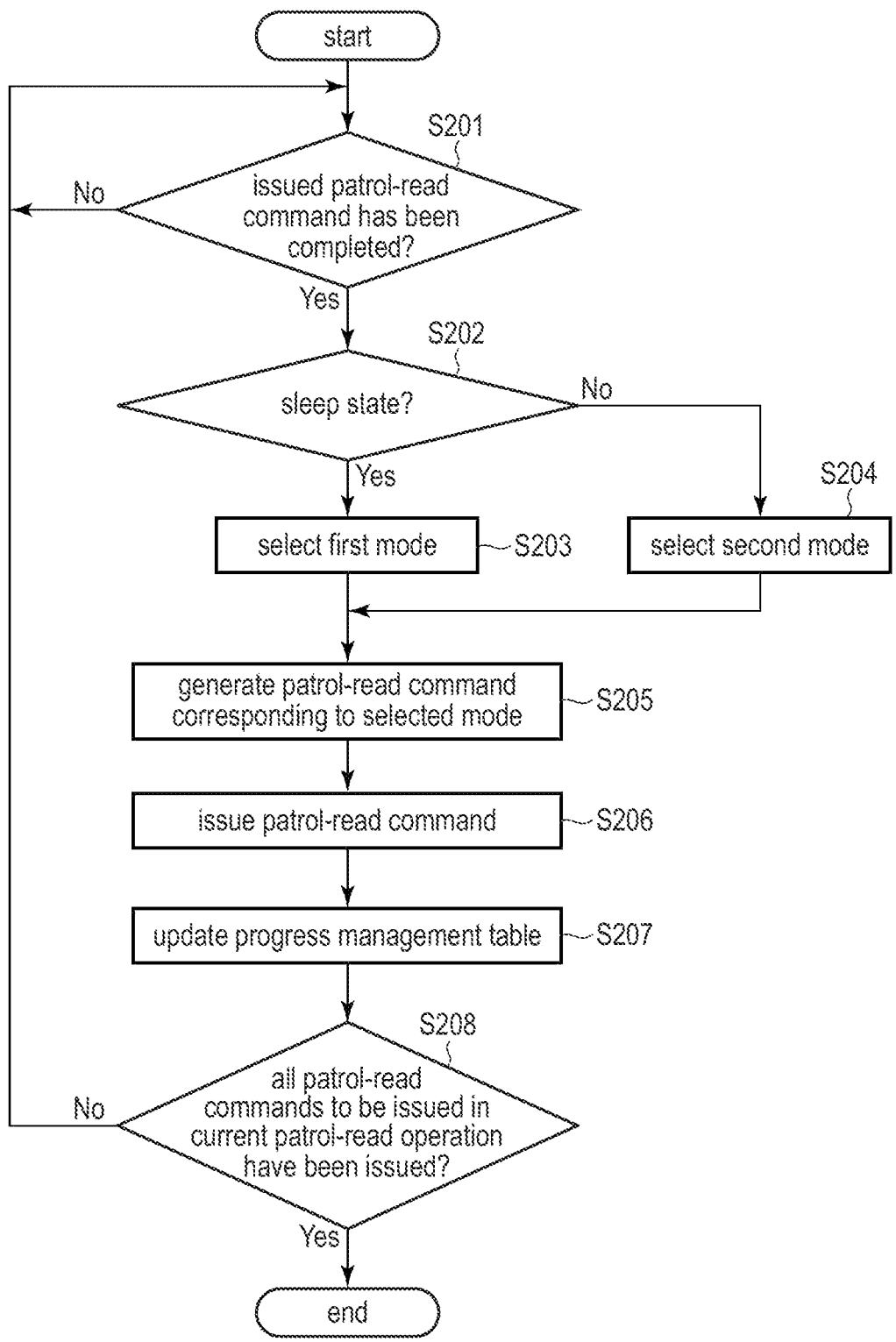
F I G. 10

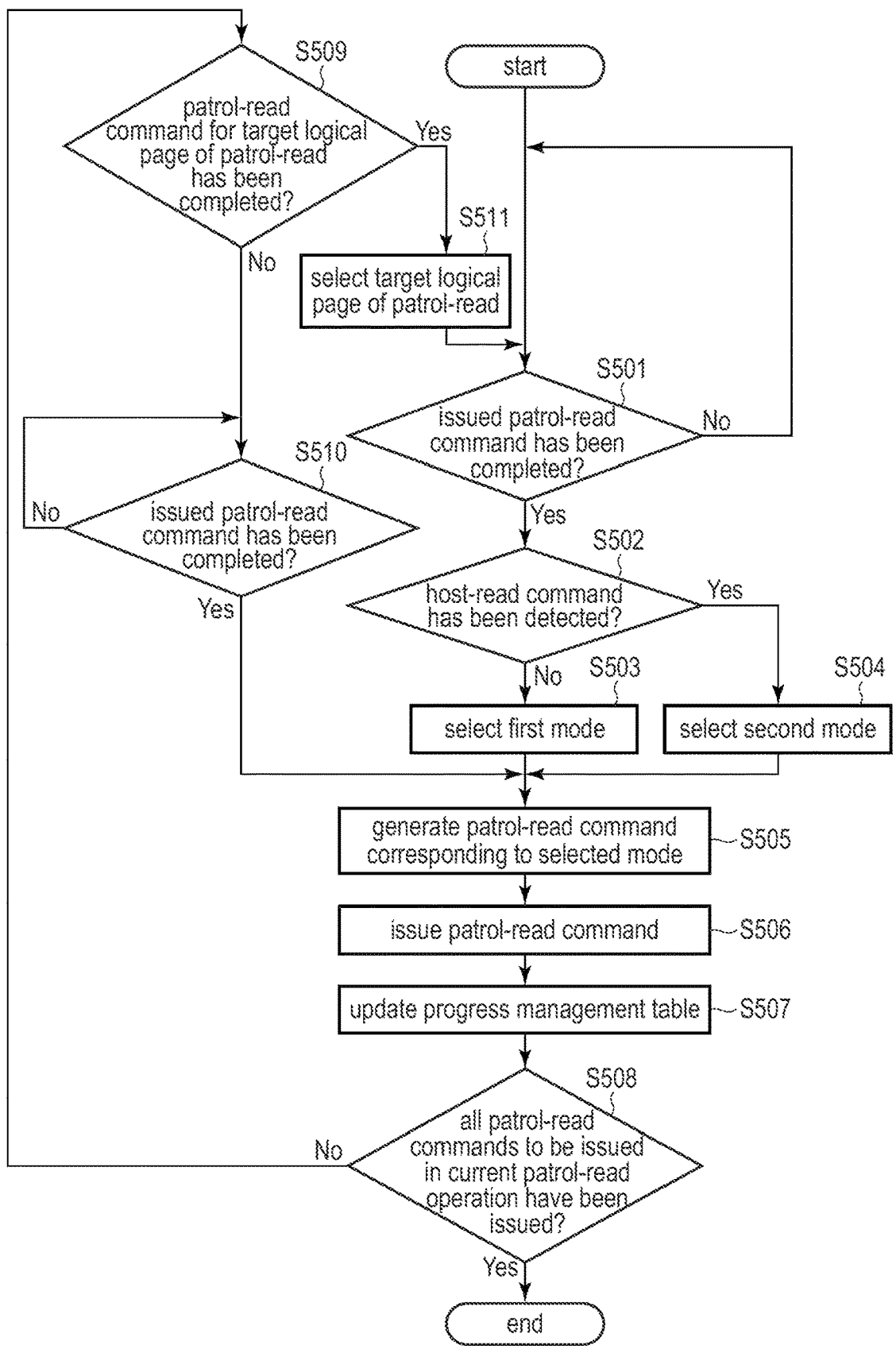
F I G. 13

MEMORY SYSTEM AND CONTROLLING METHOD

CROSS-REFERENCE TO RELATED APPLICATIONS

This application is based upon and claims the benefit of priority from Japanese Patent Application No. 2022-080916, filed May 17, 2022, the entire contents of which are incorporated herein by reference.

FIELD

Embodiments described herein relate generally to a memory system and a controlling method.

BACKGROUND

In recent years, memory systems including nonvolatile memories are widely used. As one of such memory systems, a solid state drive (SSD) that includes a NAND flash memory is known. The NAND flash memory includes a plurality of blocks. The blocks each function as a minimum unit of an erase operation.

A memory system such as an SSD may execute an operation of periodically reading data stored in a nonvolatile memory and detecting the risk of data loss in advance. This operation is referred to as a patrol-read operation or a patrol operation.

BRIEF DESCRIPTION OF THE DRAWINGS

FIG. 3 is a block diagram illustrating an example of a configuration of a logical block used in the memory system according to the embodiment.

FIG. 4 illustrates an example of a configuration of a logical page used in the memory system according to the embodiment.

FIG. 5 illustrates an example of a patrol-read operation and a refresh operation that are executed in the memory system according to the embodiment.

FIG. 7 illustrates an order of reading data in a patrol-read operation of a second mode executed in the memory system according to the embodiment.

FIG. 8 illustrates an example of a configuration of a progress management table used in the memory system according to the embodiment.

FIG. 9 is a flowchart illustrating a first procedure of the patrol-read operation executed in the memory system according to the embodiment.

FIG. 10 is a flowchart illustrating a second procedure of the patrol-read operation executed in the memory system according to the embodiment.

FIG. 13 is a flowchart illustrating a fifth procedure of the patrol-read operation executed in the memory system according to the embodiment.

DETAILED DESCRIPTION

In general, according to one embodiment, a memory system that is connectable to a host comprises a nonvolatile memory and a controller. The nonvolatile memory includes a first die and a second die. The first die is connected to a first channel. The second die is connected to a second channel different from the first channel. The controller is configured to periodically execute a first operation that includes an operation of reading data written in the nonvolatile memory and an operation of determining whether or not a number of errors in the read data is equal to or greater than a threshold value. Each of the first die and the second die includes a plurality of physical blocks. Each of the plurality of physical blocks includes a plurality of physical pages. The controller determines whether or not a read request for which processing has not been completed after the read request is received from the host exists, in the first operation. In a case where the read request does not exist, the controller selects a first mode for the first operation. In a case where the read request exists, the controller selects a second mode for the first operation. In a case where the first mode is selected, the controller issues a first read command group including read commands that specify respective contiguous memory locations that are included in a first physical page or a second physical page, and reads pieces of data that are stored in the contiguous memory locations, respectively. The first physical page is included in a first physical block of the first die, and the second physical page is included in a second physical block of the second die. In a case where the second mode is selected, the controller issues a second read command group including a read command that specifies one memory location of the memory locations in the first physical page, and a read command that specifies one memory location of the memory locations in the second physical page, and reads first data stored in the one memory location of the first physical page and second data stored in the one memory location of the second physical page.

Various embodiments will be described hereinafter with reference to the accompanying drawings.

Figure 1:
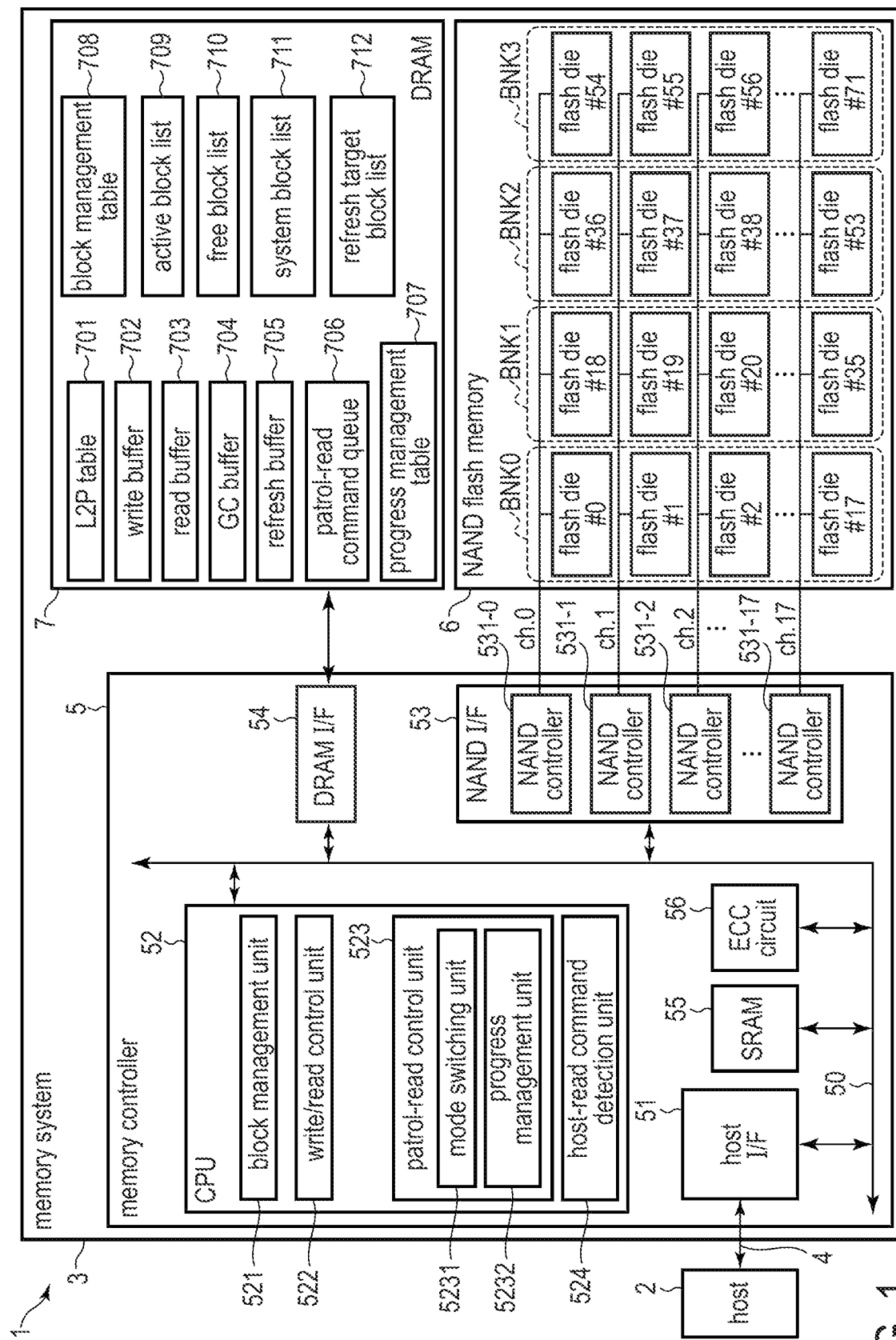
FIG. 1 is a block diagram illustrating an example of a configuration of an information processing system that includes a memory system according to an embodiment.

FIG. 1 is a block diagram illustrating an example of a configuration of an information processing system 1 that includes a memory system 3 according to an embodiment. The memory system 3 according to the embodiment is a storage device that includes a nonvolatile memory.

The information processing system 1 includes a host (host device) 2 and the memory system 3. The host 2 and the memory system 3 are connectable through a bus 4. Communication between the host 2 and the memory system 3 through the bus 4 is executed in conformity with, for example, the NVM Express™ (NVMe™) standard, or the Serial Attached SCSI (SAS) standard.

The host 2 is an information processing device. The host 2 is, for example, a personal computer or a server computer. The host 2 accesses the memory system 3. Specifically, the host 2 transmits, to the memory system 3, a write command which is a command to write data. The host 2 transmits, to the memory system 3, a read command which is a command to read data. The host 2 also transmits, to the memory system 3, an invalidation command which is a command to invalidate data. Examples of the invalidation command are an unmap command and a trim command.

The memory system 3 is a semiconductor storage device. The memory system 3 is, for example, an SSD that includes a NAND flash memory 6 that is an example of the nonvolatile memory. The memory system 3 writes data to the nonvolatile memory. In addition, the memory system 3 reads data from the nonvolatile memory.

The bus 4 is a bus that conforms to, for example, the PCI Express™ (PCIe™) standard or the SAS standard. The bus 4 is mainly used for transmission of data and input/output (I/O) commands from the host 2 to the memory system 3, and for transmission of data and responses from the memory system 3 to the host 2. Each of the I/O commands is a command to write or read data to or from the nonvolatile memory. The I/O commands include, for example, a write command and a read command. Hereinafter, a write command transmitted from the host 2 to the memory system 3 is referred to as a host-write command or a write request, and a read command transmitted from the host 2 to the memory system 3 is referred to as a host-read command or a read request.

Next, the internal configuration of the memory system 3 will be described. The memory system 3 includes a memory controller 5, a NAND flash memory 6 (hereinafter, simply referred to as NAND memory 6), and a dynamic random access memory (DRAM) 7.

The memory controller 5 is an example of a control circuit. Hereinafter, the memory controller 5 will be referred to simply as a controller 5. The controller 5 is, for example, a semiconductor device such as a system-on-a-chip (SoC). The controller 5 is communicatively connected to the NAND memory 6. The controller 5 executes writing of data to the NAND memory 6 and reading of data from the NAND memory 6. The controller 5 is also communicatively connected to the DRAM 7. The controller 5 executes writing of data to the DRAM 7 and reading of data from the DRAM 7. In addition, the controller 5 executes communication with the host 2 through the bus 4.

The NAND memory 6 is a nonvolatile memory. The NAND memory 6 is, for example, a flash memory with a two-dimensional structure or a three-dimensional structure. The NAND memory 6 includes a plurality of blocks. Each of the blocks is a minimum unit of an erase operation of data stored in the NAND memory 6. A block is also referred to as a physical block or an erase block. The blocks each include a plurality of pages. Each of the pages is a minimum unit of a data write operation and a data read operation. The data write operation is an operation to write data to a memory cell array of the NAND memory 6. The data read operation is an operation to read data from the memory cell array. Each of the pages includes, for example, a plurality of memory cells connected to a single word line. A page is also referred to as a physical page.

The DRAM 7 is a volatile memory. The DRAM 7 temporarily stores write data received from the host 2 or read data read from the NAND memory 6. In other words, the DRAM 7 may be used as a write buffer or a read buffer. The DRAM 7 also temporarily stores information used to manage the memory system 3.

An example of the internal configuration of the controller 5 will then be described. The controller 5 includes a host interface (host I/F) 51, a CPU 52, a NAND interface (NAND I/F) 53, a DRAM interface (DRAM I/F) 54, a static RAM (SRAM) 55, and an ECC circuit 56. These components are connected to an internal bus 50.

The host interface 51 is a hardware interface circuit. The host interface 51 executes communication with the host 2. For example, the host interface 51 receives I/O commands and data from the host 2. The host interface 51 also transmits data and responses to the host 2.

The CPU 52 is a processor. The CPU 52 controls the host interface 51, the NAND interface 53, the DRAM interface 54, the SRAM 55, and the ECC circuit 56. The CPU 52 loads a control program (firmware) from a ROM (not shown) or the NAND memory 6 onto the SRAM 55 or the DRAM 7. The CPU 52 performs various processes by executing the control program (firmware). For example, the CPU 52 executes management of data stored in the NAND memory 6 and management of blocks included in the NAND memory 6 as a flash translation layer (FTL). The management of data stored in the NAND memory 6 is, for example, management of mapping information which is information indicating relationship between each logical address and each physical address. The logical address is an address used by the host 2 to access the memory system 3. The logical address is, for example, an LBA (Logical Block Address). The physical address is an address that indicates a physical memory location in the NAND memory 6. In the NAND memory 6, writing data to a page of a block is executable only once per program/erase cycle. Therefore, the controller 5 writes updated data corresponding to a certain logical address not to a memory location where previous data corresponding to this logical address is stored but to a different memory location. Therefore, the CPU 52 manages the mapping between the logical address and the physical address by using a logical-to-physical address translation table (L2P table) 701. In addition, the management of the blocks included in the NAND memory 6 includes, for example, a patrol-read operation, a garbage collection operation, and a refresh operation.

The patrol-read operation is an operation for detecting a block including data in which an error has occurred. The patrol-read operation is an operation that includes reading data that has been written in the NAND memory 6 and determining whether or not the number of errors (number of error bits) in a predetermined size of data included in the read data is greater than or equal to a threshold value on the basis of error correction results by the ECC circuit 56.

The garbage collection operation is an operation for reducing the number of blocks each storing both valid data and invalid data and for increasing the number of free blocks. Each of the free blocks is a block in which valid data is not stored. The valid data is data that is stored in a memory location indicated by a physical address associated with a logical address. For example, data stored in a memory location indicated by a physical address referenced from the L2P table 701 is valid data. The valid data is data to possibly be read by the host 2 later. The invalid data is data that is stored in a memory location indicated by a physical address that is not associated with a logical address. For example, data stored in a memory location indicated by a physical address that is not referenced from the L2P table 701 is invalid data. The invalid data is data not to be read by the host 2 anymore. The garbage collection operation is executed in a case where the remaining number of free blocks falls below a threshold value.

The refresh operation is an operation of rewriting data stored in a refresh target block to another block. The refresh target block is a block that stores data for which the number of error bits is determined to be equal to or greater than a threshold value in a read operation such as the patrol-read operation.

The NAND interface 53 is a circuit that controls the NAND memory 6. The NAND interface 53 is electrically connected to a plurality of flash dies (hereinafter referred to as dies) included in the NAND memory 6. The die is a nonvolatile memory die. The die is also referred to as a nonvolatile memory chip. The NAND interface 53 includes NAND controllers 531-0, 531-1, 531-2, . . . , and 531-17. The NAND controllers 531-0, 531-1, 531-2, . . . , and 531-17 are connected to channels ch.0, ch.1, ch.2, . . . , and ch.17, respectively. Each of the NAND controllers 531-0, 531-1, 531-2, . . . , and 531-17 is connected to one or more dies through the corresponding channel. In FIG. 1, a case in which four dies are connected to each of the channels ch.0, ch.1, ch.2, . . . , and ch.17 is exemplified. In this case, the NAND controller 531-0 is connected to dies #0, #18, #36, and #54 through the channel ch.0. The NAND controller 531-1 is connected to dies #1, #19, #37, and #55 through the channel ch.1. The NAND controller 531-2 is connected to dies #2, #20, #38, and #56 through the channel ch.2. The NAND controller 531-17 is connected to dies #17, #35, #53, and #71 through the channel ch.17. The dies #0, #1, #2, . . . , and #17 are treated by the controller 5 as a bank BNK0. Similarly, the dies #18, #19, #20, . . . , and #35 are treated by the controller 5 as a bank BNK1, the dies #36, #37, #38, . . . , and #53 are treated by the controller 5 as a bank BNK2, and the dies #54, #55, #56, . . . , and #71 are treated by the controller 5 as a bank BNK3. A bank is a unit in which multiple dies are operated in parallel by interleaving operations.

The DRAM interface 54 is a circuit that controls the DRAM 7. The DRAM interface 54 writes data to the DRAM 7 and reads data stored in the DRAM 7.

The SRAM 55 is a volatile memory. The SRAM 55 may be used, for example, as a write buffer to temporarily store write data received from the host 2. The SRAM 55 may also be used, for example, as a read buffer to temporarily store data read from the NAND memory 6.

The ECC circuit 56 is a circuit that executes data encoding and data decoding. Before data is written to the NAND memory 6, the ECC circuit 56 executes encoding to add an error correction code (ECC) to the data as a redundancy code. The ECC circuit 56 executes decoding to correct errors in data that has been read from the NAND memory 6, by using the ECC added to the data. The ECC circuit 56 includes multiple circuits. For example, the multiple circuits execute multiple levels of error correction processing, respectively. The multiple levels of error correction processing have different error correction capabilities from each other. For example, the multiple levels of error correction processing may include a first level of error correction processing, a second level of error correction processing, and a third level of error correction processing. The first level of error correction processing uses a certain error correction algorithm. The second level of error correction processing uses another error correction algorithm and has a higher error correction capability than the first level of error correction processing. The third level of error correction processing uses yet another error correction algorithm and has a higher error correction capability than the second level of error correction processing.

Next, an example of a functional configuration of the CPU 52 will be described.

The CPU 52 includes a block management unit 521, a write/read control unit 522, a patrol-read control unit 523, and a host-read command detection unit 524.

The block management unit 521 manages a plurality of blocks used in the memory system 3. The block management unit 521 constructs a plurality of logical blocks from sets of physical blocks that are included in the dies #0 to #71, respectively. Each of the logical blocks includes a plurality of physical blocks that are included in the dies #0 to #71, respectively. A logical block is also referred to as a block group or a super block. Each of the plurality of logical blocks is a set of physical blocks that are included in different dies from each other. Each of the plurality of logical blocks includes, for example, a total of 72 physical blocks that are included in the dies #0 to #71, respectively. Note that, in a case where each of the dies #0 to #71 has a 2-plane configuration, each of the plurality of logical blocks includes, for example, 144 physical blocks (=72 dies×2 planes). Each of the plurality of logical blocks includes the same number of logical pages as the number of pages (physical pages) included in one physical block. One logical page includes the same number of physical pages as the number of physical blocks included in a logical block. For example, in a case where one logical block is constructed of physical blocks #1 to #10, and each of the physical blocks #1 to #10 includes physical pages #1 to #255, this logical block includes logical pages #1 to #255. Each of the logical pages #1 to #255 includes ten physical pages, which is the same number as the number of physical blocks #1 to #10. For example, the logical page #1 is a set of ten physical pages #1 that are included in the physical blocks #1 to #10, respectively. A logical page is also referred to as a page group or a super page. The block management unit 521 manages information indicating each of the physical blocks that configures a logical block per the logical block by using a block management table 708. A physical block is identified, for example, by either an identifier of a die and a physical block address in the die, or an identifier of a die, an identifier of a plane, and a physical block address in the plane. A die is identified by a channel number and a bank number. The block management unit 521 selects one logical block from the plurality of logical blocks and allocates the selected logical block as a write destination block. The write destination block is a block (logical block) to which data is to be written.

The block management unit 521 manages the plurality of logical blocks by using an active block list 709, a free block list 710, a system block list 711, and a refresh target block list 712.

The block management unit 521 registers, in the active block list 709, a logical block including valid data. Hereinafter, the logical block registered in the active block list 709 is referred to as an active block.

The block management unit 521 registers, in the free block list 710, a logical block not including valid data. The logical block registered in the free block list 710 is a logical block in which new data can be stored after being executed an erase operation. Hereinafter, the logical block registered in the free block list 710 is referred to as a free block.

The block management unit 521 registers, in the system block list 711, a logical block used to store management data which is information used to manage the memory system 3. Hereinafter, the logical block registered in the system block list 711 is referred to as a system block.

The block management unit 521 registers, in the refresh target block list 712, a logical block selected as a refresh target block.

The write/read control unit 522 controls an operation of writing data to the NAND memory 6 and an operation of reading data from the NAND memory 6. The write/read control unit 522 generates a program command and issues the generated program command to the NAND memory 6 through the NAND interface 53 (NAND controllers 531-0 to 531-17). The program command is an instruction to write data to the NAND memory 6. In addition, the write/read control unit 522 generates a read command and issues the generated read command to the NAND memory 6 through the NAND interface 53 (NAND controllers 531-0 to 531-17). The read command is an instruction to read data from the NAND memory 6.

The write/read control unit 522 generates a program command for the NAND memory 6, based on, for example, a host write command, a garbage collection operation (a GC operation), a refresh operation, etc.

The write/read control unit 522 receives a host write command through the host interface 51. The host write command specifies at least a logical address corresponding to write data to be written to the NAND memory 6 and the size of the write data. The write/read control unit 522 receives the write data, which is associated with the received host write command, from the host 2 and stores the received write data in a write buffer 702. The write/read control unit 522 then determines a write destination memory location in the write destination block where the write data is to be written. The write/read control unit 522 generates a program command to write the write data to the write destination memory location. The write/read control unit 522 issues the generated program command to the NAND memory 6 through a command queue (not shown) and the NAND interface 53. In this way, the write/read control unit 522 writes the write data, which is associated with the host write command, to the write destination memory location in the write destination block.

In the GC operation, the write/read control unit 522 writes data that is stored in a garbage collection (GC) buffer 704, to a copy destination block (GC destination block) of the NAND memory 6. The data stored in the GC buffer 704 is valid data read from a GC target block. When writing in the GC operation, the write/read control unit 522 also issues a program command to the NAND memory 6 through a command queue (not shown) and the NAND interface 53.

In the refresh operation, the write/read control unit 522 writes data that is stored in a refresh buffer 705, to a refresh destination block of the NAND memory 6. The data stored in the refresh buffer 705 is data read from a refresh target block. When writing in the refresh operation, the write/read control unit 522 also issues a program command to the NAND memory 6 through a command queue (not shown) and the NAND interface 53.

In addition, the write/read control unit 522 generates a read command to be issued to the NAND memory 6, based on a host-read command, the garbage collection operation (the GC operation), the refresh operation, etc.

The write/read control unit 522 receives a host-read command through the host interface 51. The host-read command specifies at least a logical address corresponding to read data to be read from the NAND memory 6 and the size of the read data. The write/read control unit 522 obtains, from the L2P table 701, a physical address corresponding to the logical address specified by the received host-read command. The write/read control unit 522 generates a read command to read data from a memory location indicated by the obtained physical address. The write/read control unit 522 issues the generated read command to the NAND memory 6 through a command queue (not shown) and the NAND interface 53. In this way, the write/read control unit 522 reads data corresponding to the host-read command from the NAND memory 6. The write/read control unit 522 transmits the read data to the host 2 through the host interface 51.

In the GC operation, the write/read control unit 522 reads valid data from the GC target block. The GC target block is selected from logical blocks registered in the active block list 709. The write/read control unit 522 stores the valid data read from the GC target block, in the GC buffer 704. When reading in the GC operation, the write/read control unit 522 also issues a read command to the NAND memory 6 through a command queue (not shown) and the NAND interface 53.

In the refresh operation, the write/read control unit 522 reads data from a refresh target block. The refresh target block is a logical block registered in the refresh target block list 712. Data read from the refresh target block may be all data stored in the refresh target block or only valid data stored in the refresh target block. The write/read control unit 522 stores the data read from the refresh target block, in the refresh buffer 705. In a case where the read data includes errors (error bits), error correction is executed by the ECC circuit 56. The error-corrected data is then stored in the refresh buffer 705. When reading in the refresh operation, the write/read control unit 522 also issues a read command to the NAND memory 6 through a command queue (not shown) and the NAND interface 53.

The patrol-read control unit 523 controls a patrol-read operation. The patrol-read control unit 523 periodically executes the patrol-read operation. For example, the patrol-read control unit 523 starts the patrol-read operation every time a first time period elapses. The patrol-read control unit 523 determines the number of logical pages for which read operations are to be executed in one patrol-read operation. In a case where the patrol-read operation is executed every time the first time period elapses, the number of logical pages for which the read operations are to be executed in one patrol-read operation is determined so that patrol-read operations for the plurality of logical blocks managed in the memory system 3 can be completed within a time period that is sufficiently longer than the first time period. For example, in a case where the patrol-read operation is periodically executed at two seconds intervals, the patrol-read control unit 523 determines the number of logical pages for which the read operations are to be executed in one patrol-read operation so that the patrol-read operation for the logical blocks of the target is completed within 24 hours.

When the patrol-read operation has started, the patrol-read control unit 523 executes the read operations for the determined number of logical pages. For example, in a case where the determined number of logical pages is ten, the patrol-read control unit 523 executes the read operations for ten logical pages in one patrol-read operation. The ten logical pages need not be a set of logical pages that are included in the same logical block, but may be, for example, a set of logical pages that are included in ten logical blocks, respectively, that differ from each other. The patrol-read control unit 523 selects logical blocks for a target of a patrol-read operation and logical pages of a target of the patrol-read operation in a predetermined order.

The patrol-read control unit 523 generates several read commands for reading pieces of data written in the selected logical page of the target of the patrol-read operation in units of management size such as a cluster from the NAND memory 6. Each of the generated read commands is issued to the NAND memory 6 through the NAND interface 53

(NAND controllers 531-0 to 531-17). More specifically, the patrol-read control unit 523 stores a read command group including the several generated read commands, in a patrol-read command queue 706. Each of the read commands stored in the patrol-read command queue 706 is issued to the NAND memory 6 through the NAND interface 53 (NAND controllers 531-0 to 531-17) at a timing that does not interfere with a data read operation based on a host-read command. A read command generated by the patrol-read control unit 523 is referred to as a patrol-read command.

The logical block selected as the target of the patrol-read operation may be a free block or a system block. In this case, the patrol-read control unit 523 skips the patrol-read operation for a logical page included in the selected logical block and selects a logical block and a logical page for a new target of the patrol-read operation. At this time, the patrol-read control unit 523 adds the number of logical pages for which the patrol-read operation is skipped (here, one logical page) to the number of logical pages for which the patrol-read operation is completed.

In data read from the NAND memory 6 in the patrol-read operation, the ECC circuit 56 may detect that the number of error bits included in data having a predetermined size such as a cluster is equal to or greater than a threshold value. In this case, the patrol-read control unit 523 registers the logical block that includes the logical page of the current target of the patrol-read operation, in the refresh target block list 712. At this time, the patrol-read control unit 523 skips the patrol-read operation for the logical page of the target of the patrol-read operation and adds the number of logical pages for which the patrol-read operation is skipped (here, one logical page) to the number of logical pages for which the patrol-read operation is completed. Then, the patrol-read control unit 523 selects a logical block and a logical page for a new target of the patrol-read operation.

In addition, the patrol-read control unit 523 reads data for the patrol-read operation by selectively using two types of patrol-read modes (a first patrol-read mode and a second patrol-read mode) in which the order of reading data in a logical page is different from each other. In the first patrol-read mode (hereinafter referred to as a first mode), the patrol-read control unit 523 reads data from logical pages in an order suitable for efficiently executing the patrol-read operation. In the case where the first mode is used, the time required to execute the patrol-read operation and the power consumed by the memory system 3 can be reduced. In the second patrol-read mode (hereinafter referred to as a second mode), the patrol-read control unit 523 reads data from logical pages in an order suitable for reducing the impact on the latency of host-read command processing. The host-read command processing is an operation of reading user data from the NAND memory 6 on the basis of a host-read command. The user data is data that is accessed on the basis of an I/O command (for example, a host-write command or a host-read command) that specifies logical addresses. In the following, the host-read command processing is also referred to as a host-read operation. In the case where the second mode is used, even in a case of a conflict between a read operation for operations other than the patrol-read operation, such as the host-read operation or a read operation for a GC operation, and the patrol-read operation, the increase in the latency of the read operation for the operations other than the patrol-read operation can be minimized.

The patrol-read control unit 523 includes a mode switching unit 5231 and a progress management unit 5232.

The mode switching unit 5231 switches a patrol-read mode to be applied to the patrol-read operation between the first mode and the second mode on the basis of whether or not a received and uncompleted host-read command exists. In other words, the mode switching unit 5231 selects the first mode or the second mode as the patrol-read method based on whether or not the received and uncompleted host-read command exists. The received and uncompleted host-read command is a host-read command for which processing has not been completed among host-read commands that have been received from the host 2 by the host interface 51. In a case where no received and uncompleted host-read commands exist, the mode switching unit 5231 selects the first mode. In a case where the received and uncompleted host-read command exists, the mode switching unit 5231 selects the second mode. The mode switching unit 5231 determines whether or not the received and uncompleted host-read command exists on the basis of a notification from the host-read command detection unit 524.

The mode switching unit 5231 may also determine whether or not the received and uncompleted host-read command exists on the basis of whether or not the memory system 3 is in a sleep state. For example, in a case where no I/O commands have been received from the host 2 continuously for more than a certain period of time, the controller 5 transitions the memory system 3 to a sleep state which is a state in which the power consumption is reduced. When an I/O command has been received from the host 2 while the memory system 3 is in the sleep state, the controller 5 transitions the memory system 3 from the sleep state to a normal state. The controller 5 may also manage a first flag that indicates whether the memory system 3 is in the sleep state or not. For example, the controller 5 sets the value of the first flag to "1" when the memory system 3 has transitioned from the normal state to the sleep state, and sets the value of the first flag to "0" when the memory system 3 has transitioned from the sleep state to the normal state. The mode switching unit 5231 refers to the value of the first flag and, on the basis of the reference result, determines whether the memory system 3 is in the sleep state or the normal state.

Even in the case where the memory system 3 is in the sleep state, the patrol-read operation is executed periodically. The processing of an I/O command and the garbage collection operation (GC operation) are suspended in the sleep state. While the memory system 3 is in the sleep state, no received and uncompleted host-read commands exist. Therefore, while the memory system 3 is in the sleep state, the mode switching unit 5231 selects the first mode. While the memory system 3 is in the normal state, the mode switching unit 5231 selects the second mode. That is, while the memory system 3 is in the sleep state, the controller 5 executes the patrol-read operation in the first mode. In the case where the memory system 3 is in the normal state, the controller 5 executes the patrol-read operation in the second mode.

The mode switching unit 5231 may also select either the first mode or the second mode on the basis of whether or not it is necessary to perform the GC operation. For example, the mode switching unit 5231 determines whether or not the memory system 3 is in a state where execution of the GC operation is needed by determining whether or not the number of free blocks is below a threshold value. In a case where the number of free blocks is equal to or above the threshold value, the mode switching unit 5231 selects the first mode. In a case where the number of free blocks is below the threshold value, the mode switching unit 5231 selects the second mode. In a case where the received and uncompleted host-read command exists even when the number of free blocks is equal to above the threshold value, the mode switching unit 5231 may select the second mode. This minimizes the impact on the latency of read operations in both of the host-read operation and the GC operation. In a case where the number of free blocks is equal to or above the threshold value and no received and uncompleted host-read commands exist, the mode switching unit 5231 may select the first mode. This allows the patrol-read operation to be executed efficiently.

The progress management unit 5232 manages information indicating a memory location from which data has been read in the patrol-read operation among the plurality of memory locations included in the logical page of the target of the patrol-read operation. When data has been read from the logical page, the progress management unit 5232 updates the information in a progress management table 707.

The host-read command detection unit 524 detects whether or not the host interface 51 has received a host-read command. The controller 5 (e.g., the host interface 51) may, for example, manage a second flag indicating whether or not the received and uncompleted host-read command exists. The controller 5 sets the second flag to "1" when the host interface 51 has received a host-read command. In addition, when the controller 5 has transmitted a completion response indicating the completion of the host-read command to the host 2 through the host interface 51, the controller 5 determines whether or not there is a host-read command for which a completion response is yet to be transmitted. In a case where there is no host-read command for which a completion response is yet to be transmitted, the controller 5 sets the second flag to "0". In a case where there is a host-read command for which a completion response is yet to be transmitted, the controller 5 maintains the second flag at "1". The host-read command detection unit 524 refers to the second flag and, on the basis of the reference result, determines whether or not the received and uncompleted host-read command exists.

Next, information stored in the DRAM 7 will be described. The DRAM 7 stores the L2P table 701, the write buffer 702, a read buffer 703, the garbage collection (GC) buffer 704, the refresh buffer 705, the patrol-read command queue 706, the progress management table 707, the block management table 708, the active block list 709, the free block list 710, the system block list 711, and the refresh target block list 712. All or part of the information stored in the DRAM 7 may be stored in the SRAM 55 of the controller 5 instead of being stored in the DRAM 7.

The L2P table 701 manages mapping between each logical address and each physical address for each predetermined size such as a cluster.

The write buffer 702 is a storage area where data (user data) to be written to the NAND memory 6 is temporarily stored.

The read buffer 703 is a storage area where data (user data) read from the NAND memory 6 is temporarily stored.

The GC buffer 704 is a storage area where data read from an active block in the GC operation is temporarily stored.

The refresh buffer 705 is a storage area where data read from a refresh target block in the refresh operation is temporarily stored.

The patrol-read command queue 706 is a queue where one or more read commands generated in a patrol-read operation are temporarily stored.

The progress management table 707 is a table for managing an execution status of a read operation for a logical page of a target of the patrol-read operation.

The block management table 708 is a table for managing, for each logical block, information indicating a plurality of physical blocks configuring each of the logical blocks.

The active block list 709 is a list for managing active blocks, which are logical blocks storing valid data.

The free block list 710 is a list for managing free blocks, which are logical blocks that store no valid data.

The system block list 711 is a list for managing system blocks, which are logical blocks used to store management data. The management data includes, for example, the L2P table 701, the block management table 708, and various other data used for management of the memory system 3.

The refresh target block list 712 is a list for managing refresh target blocks, which are logical blocks storing data in which the number of errors detected in the patrol-read operation is equal to or greater than a threshold value.

Figure 2:
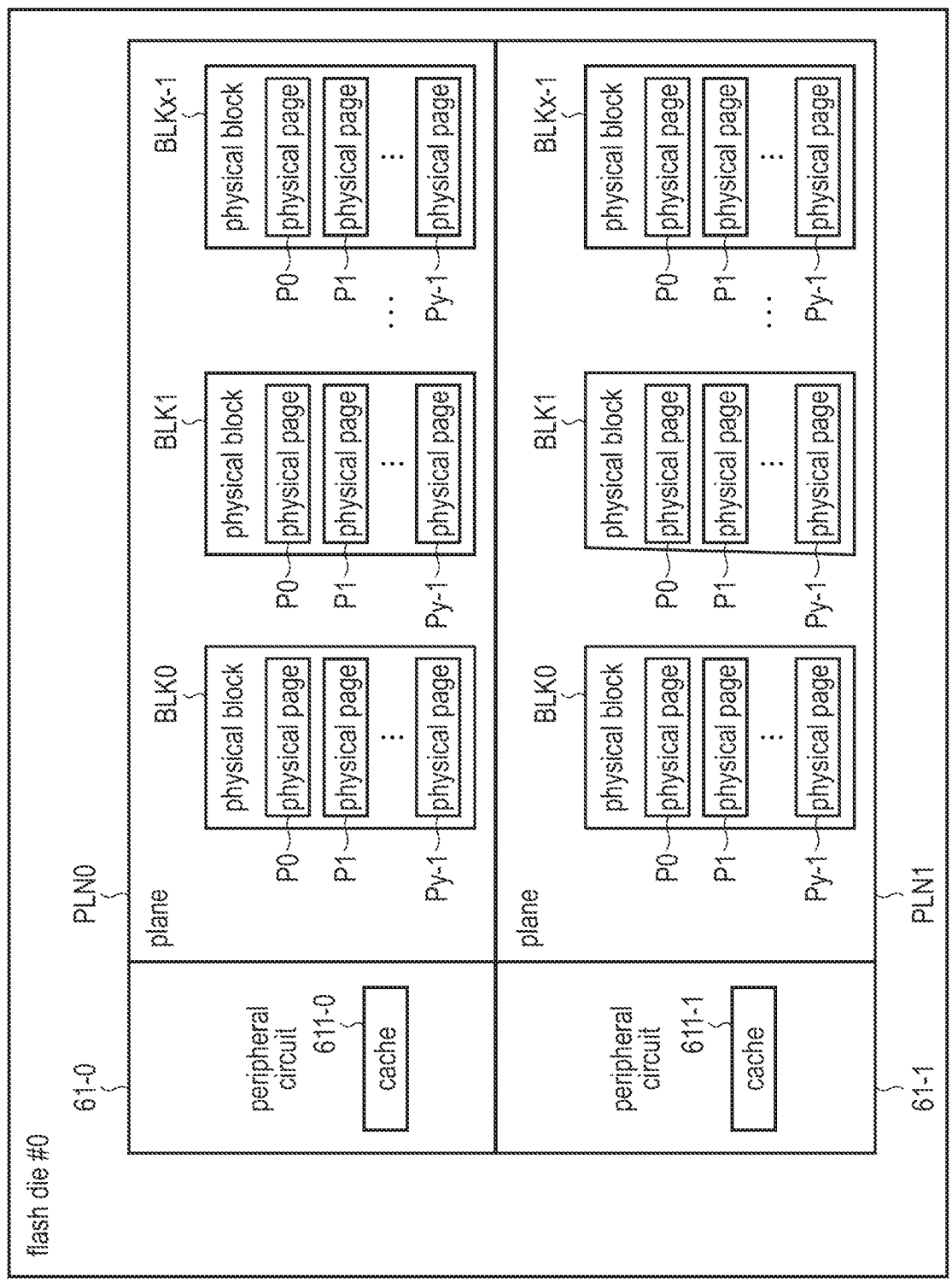
FIG. 2 is a block diagram illustrating an example of a configuration of a NAND flash memory die included in the memory system according to the embodiment.

Next, an example of a configuration of a die of the NAND memory 6 will be described. FIG. 2 is a block diagram illustrating an example of a configuration of the die #0 included in the memory system 3 according to the embodiment.

The die #0 includes two planes (i.e., a plane PLN0 and a plane PLN1) and two peripheral circuits (i.e., a peripheral circuit 61-0 and a peripheral circuit 61-1) that correspond to the two planes, respectively.

Each of the planes PLN0 and PLN1 includes a memory cell array. The memory cell array of each of the planes PLN0 and PLN1 includes physical blocks BLK0 to BLKx–1. Each of the physical blocks BLK0 to BLKx–1 is a minimum unit of a data erase operation. The data erase operation is an operation to erase data stored in the NAND memory 6. Each of the physical blocks BLK0 to BLKx–1 is also referred to as an erase block, a flash block, or a memory block. Each of the physical blocks BLK0 to BLKx–1 includes physical pages P0 to Py–1. Each of the physical pages P0 to Py–1 is a unit of a data write operation or a data read operation. Each of the physical pages P0 to Py–1 includes, for example, a plurality of memory cells connected to a single word line.

Each of the peripheral circuits 61-0 and 61-1 is a circuit that controls the memory cell array of a corresponding plane. Each of the peripheral circuits 61-0 and 61-1 includes, for example, a row decoder, a column decoder, a sense amplifier, a page buffer, and a voltage generation circuit. Each of the peripheral circuits 61-0 and 61-1 executes a program operation, a read operation, or an erase operation on the memory cell array in response to receiving an address and a command from the NAND interface 53.

The peripheral circuit 61-0 controls the memory cell array of the plane PLN0. The peripheral circuit 61-0 further includes a cache 611-0. The cache 611-0 temporarily stores data read from a physical page of the plane PLN0. The size of data that can be stored in the cache 611-0 is the same as the size of a physical page. The physical page has a size that can store pieces of data each having a predetermined size, such as a cluster. The following describes a case where the size of a physical page is the size of four clusters. The cluster, for example, has the size of eight sectors. In a case where a sector has a size of 512 bytes, a cluster has a size of 4 KiB.

For example, in a case where two read commands that specify different clusters (different column addresses) in the same physical page have been received consecutively from the NAND interface 53, the peripheral circuit 61-0 executes, in accordance with the first read command of the two read commands, a read operation to read data for one physical page size (here, four clusters) from the physical page of the plane PLN0 to a page buffer (not shown) of the peripheral circuit 61-0. A read time which is the time required for the read operation is referred to as tR. The peripheral circuit 61-0 stores, in the cache 611-0, the data for four clusters read from the physical page to the page buffer. Also, in synchronization with a data output cycle (Dout) executed by the NAND interface 53, the peripheral circuit 61-0 outputs the data for one cluster that is specified by the first read command, to the NAND interface 53. Then, in accordance with the second read command of the two read commands, the peripheral circuit 61-0 output the data for one cluster that is specified by the second read command, to the NAND interface 53 in synchronization with the data output cycle (Dout) executed by the NAND interface 53, by using the data stored in the cache 611-0. Thus, the cache 611-0 can be effectively used by consecutively reading pieces of data stored in multiple memory locations in the same physical page. As a result, the number of times data is read from the memory cell array can be reduced, thereby reducing the impact of read-disturbance, reducing the time required to read data from the NAND memory 6, and saving power consumption.

In a case where a first read operation to read data from a certain physical page to a page buffer is executed and then a second read operation to read data from another physical page to the page buffer is executed, data that has been stored in the cache 611-0 in the first read operation is rewritten by data read from the another physical page in the second read operation. Furthermore, the peripheral circuit 61-1 also controls the memory cell array of the plane PLN1 by executing the same operation as that of the peripheral circuit 61-0.

Next, the logical block will be described. FIG. 3 is a block diagram illustrating an example of a configuration of a logical block used in the memory system 3 according to the embodiment. For simplicity, in the following description, a case in which the number of channels is 18, the number of banks is two, and the number of planes is two will be described.

One logical block includes a total of 72 physical blocks, each of which is selected from each plane of 36 dies (dies #0 to #35) corresponding to the configuration of the 18 channels (ch.0 to ch.17)×the two banks (banks BNK0 and BNK1). Note that, in a case where each of the dies #0 to #35 has a configuration including one plane, one logical block includes a total of 36 physical blocks, each of which is selected from each of the dies #0 to #35.

In FIG. 3, one logical block #5 including 72 physical blocks (here, a physical block BLK5 of each of the planes PLN0 and PLN1 that are included in each of the dies #0, #18, #1, #19, . . . , #17, and #35) is exemplified.

The logical block #5 includes the same number of logical pages as the number of the physical pages P0 to Py−1 included in each of the physical blocks configuring the logical block #5. One logical page includes 72 physical pages, which is the same number as the number of physical blocks BLK5 included in the logical block #5. For example, a logical page #1 of the logical block #5 includes a physical page P1 of the physical block BLK5 of each of the planes PLN0 and PLN1 that are included in each of the dies #0, #18, #1, #19, . . . , #17, and #35.

Next, an example of a configuration of the logical page will be described. FIG. 4 illustrates an example of a configuration of a logical page used in the memory system 3 according to the embodiment. In FIG. 4, among the plurality of logical pages included in the logical block #5, the logical page #1 will be focused and described.

The logical page #1 includes 72 physical pages. The 72 physical pages are included in the 72 physical blocks, respectively, that are included in the logical block #5. In other words, each of the physical pages included in the logical page #1 is uniquely identified by a channel number, a bank number, and a plane number.

Each of the physical pages in the logical page #1 includes four memory locations that correspond to four clusters, respectively. Each of the four memory locations (four clusters) included in one physical page is uniquely identified by an offset (+0, +1, +2, +3) indicative of a column address.

For example, a physical page identified by the channel ch.0, the bank BNK0, and the plane PLN0 is the physical page P1 of the physical block BLK5 of the plane PLN0 of the die #0. Upon receiving a read command specifying a cluster of offset +0 of this physical page (clst (ch.0, BNK0, PLN0, +0)), the peripheral circuit 61-0 included in the plane PLN0 of the die #0 reads data for four clusters from this specified physical page to the page buffer.

Hereinafter, a cluster of offset +Ofs of a physical page identified by a channel ch.X, a bank BNK Y, and a plane PLN Z is represented by clst (ch.X, BNK Y, PLN Z, +Ofs). The peripheral circuit 61-0 stores the data for four clusters that has been read to the page buffer, in the cache 611-0. Then, the peripheral circuit 61-0 transmits data for one cluster stored in the cache 611-0 that corresponds to clst (ch.0, BNK0, PLN0, +0), to the controller 5. Subsequently, in a case where a read command specifying clst (ch.0, BNK0, PLN0, +2) has been received, the peripheral circuit 61-0 reads data for one cluster that corresponds to clst (ch.0, BNK0, PLN0, +2), from the cache 611-0 and transmits the read data to the controller 5.

Next, the patrol-read operation will be described. FIG. 5 illustrates an example of the patrol-read operation executed in the memory system 3 according to the embodiment.

The controller 5 executes the patrol-read operation periodically. For example, the controller 5 starts a patrol-read operation every two seconds.

In the patrol-read operation, the controller 5 selects a logical block from logical blocks (active blocks) registered in the active block list 709, logical blocks (free blocks) registered in the free block list 710, and logical blocks (system blocks) registered in the system block list 711 as a patrol-read target block. In other words, the controller 5 selects any logical block from all the logical blocks in the memory system 3. An active block is a logical block that contains valid data. A free block is a logical block that does not contain valid data. A system block is a logical block that stores management data.

Here, a write destination block, which is a logical block to which write data (user data) stored in the write buffer 702 is to be written on the basis of a host write command, is assigned from the free block list 710. When the data writing to the write destination block is completed, that is, when a logical block allocated as the write destination block has been filled with data, the controller 5 deallocates the logical block used as the write destination block and registers the logical block in the active block list 709. Alternatively, the controller 5 may register the logical block in the active block list 709 when the logical block is allocated as the write destination block.

When data writing to a certain write destination block is completed, that is, when a logical block allocated as the write destination block has been filled with data, the controller 5 selects a logical block from the free block list 710. After executing an erase operation on the selected logical block, the controller 5 allocates the selected logical block as the write destination block. Alternatively, the controller 5 may execute an erase operation on the logical block immediately before writing write data to the logical block, which is allocated as the write destination block, for the first time.

Data may be written to a system block by using a write method different from, for example, a write method for a user block, which is a logical block used to store user data. For example, in a case where a triple level cell (TLC) mode storing three bits of data per memory cell is used as the write method for the user block, a single level cell (SLC) mode storing one bit of data per memory cell may be used as the write method for the system block.

In a case where an active block is selected as the patrol-read target block, the controller 5 reads data for each cluster from a logical page of the selected active block and determines whether or not occurrence of a read error has been detected, that is, whether or not the read data includes errors equal to or greater than a threshold value. Here, the data read from the logical page of the active block may be all data stored in the logical page or only valid data stored in the logical page. In a case where the occurrence of a read error has been detected in any of the clusters stored in the logical page of the selected active block, the controller 5 registers the active block in the refresh target block list 712.

Furthermore, as a result of the patrol-read operation on all logical pages of the selected active block, in a case where the occurrence of a read error is not detected in any of the clusters, the controller 5 returns this active block to the active block list 709.

In a case where a free block is selected as a patrol-read target block, the controller 5 finishes the patrol-read operation for the selected free block without issuing a patrol-read command. The controller 5 then returns the selected free block to the free block list 710, skips the patrol-read operation for logical pages included in the free block, and adds the number of the logical pages for which the patrol-read operation have been skipped (here, one logical page) to the number of logical pages for which the patrol-read operation has been completed. Since the controller 5 does not need to maintain invalid data stored in the free block, the patrol-read operation for the free block can be omitted.

In a case where a system block is selected as a patrol-read target block, the controller 5 may skip the patrol-read operation for the system block. This is because data stored in a system block in which management data is written in the SLC mode, for example, has its reliability guaranteed for a longer period than, for example, a user block (active block) in which user data is written in the TLC mode. At this time, the controller 5 finishes the patrol-read operation for the selected system block without issuing a patrol-read command. The controller 5 then returns the selected system block to the system block list 711, skips the patrol-read operation for logical pages of the system block, and adds the number of the logical pages for which the patrol-read operation has been skipped (here, one logical page) to the number of logical pages for which the patrol-read operation has been completed. Alternatively, the controller 5 may execute a patrol-read operation for the system block that is different from the patrol-read operation for the user block.

The controller 5 executes a refresh operation on a refresh target logical block registered in the refresh target block list 712. The controller 5 reads data from the refresh target logical block and stores the data in the refresh buffer 705. The controller 5 may read all data in the refresh target logical block, or may read only valid data in the refresh target logical block. Then, the controller 5 writes the data, which is stored in the refresh buffer 705, to a logical block allocated as a refresh destination block. The controller 5 allocates any free block as the refresh destination block. After data writing to the logical block allocated as the refresh destination block is completed, the controller 5 registers this logical block in the active block list 709. In addition, the controller 5 registers the refresh target logical block from which all the data or all the valid data has been read, in the free block list 710.

Next, the two modes in the patrol-read operation will be described.

Figure 6:
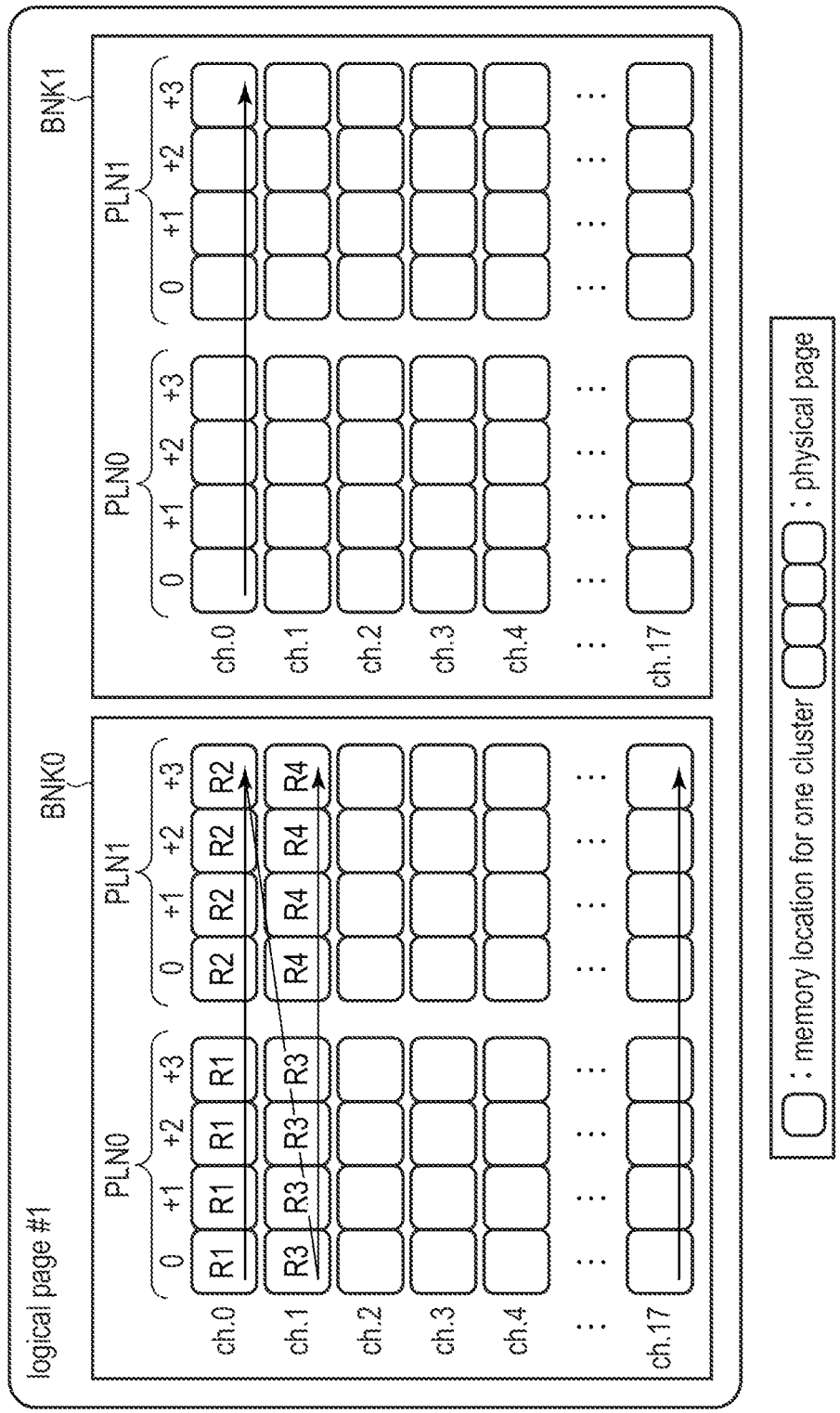
FIG. 6 illustrates an order of reading data in a patrol-read operation of a first mode executed in the memory system according to the embodiment.

First, the first mode of the patrol-read operation is described. FIG. 6 illustrates the order of reading data in the first mode of the patrol-read operation executed in the memory system 3 according to the embodiment.

Here, a case in which the patrol-read operation is executed for a logical page (here, a logical page #1) of a target of the patrol-read operation is described.

In the first mode of the patrol-read operation, the controller 5 consecutively reads pieces of data that correspond to four clusters from each physical page included in the logical page #1 in an order that overs clusters of the same channel (the order shown horizontally in FIG. 6). This reading order enables effective use of a cache provided for each plane of each die.

First, the controller 5 issues a patrol-read command specifying clst (ch.0, BNK0, PLN0, +0), a patrol-read command specifying clst (ch.0, BNK0, PLN0, +1), a patrol-read command specifying clst (ch.0, BNK0, PLN0, +2), and a patrol-read command specifying clst (ch.0, BNK0, PLN0, +3) as a group of patrol-read commands (patrol-read command group R1). The controller 5 stores the patrol-read command group R1 in the patrol-read command queue 706. The four patrol-read commands of the patrol-read command group R1, which are stored in the patrol-read command queue 706, are transmitted one by one to the die (ch.0, BNK0) that is identified by the channel ch.0 and the bank BNK0, that is, to die #0, by the NAND controller 531-0.

When having received the patrol-read command specifying clst (ch.0, BNK0, PLN0, +0), the peripheral circuit 61-0 of the die #0 executes a read operation for reading data for one physical page (data for four clusters) from a physical page including clst (ch.0, BNK0, PLN0, +0) (i.e., the physical page P1 of the physical block BLK5 included in the plane PLN0 of the die #0) to a page buffer of the peripheral circuit 61-0. The peripheral circuit 61-0 stores the read data for four clusters in the cache 611-0. Thus, the data for four clusters stored in four memory locations from clst (ch.0, BNK0, PLN0, +0) to clst (ch.0, BNK0, PLN0, +3), that is, the data for one physical page stored in the physical page P1 of the physical block BLK5 included in the plane PLN0 of the die #0 is stored in the cache 611-0. By the controller 5 executing a data read cycle (Dout), data for one cluster that corresponds to clst (ch.0, BNK0, PLN0, +0) is transferred from the die #0 to the controller 5.

Since data for one page stored in the physical page P1 of the physical block BLK5 included in the plane PLN0 of the die #0 is stored in the cache 611-0, when the patrol-read command specifying clst (ch.0, BNK0, PLN0, +1) has been received from the controller 5, the peripheral circuit 61-0 uses the data stored in the cache 611-0 to output data for one cluster that corresponds to clst (ch.0, BNK0, PLN0, +1), to the controller 5. Specifically, by the controller 5 executing the data read cycle (Dout), the data for one cluster that corresponds to clst (ch.0, BNK0, PLN0, +1) is transferred from the cache 611-0 of the die #0 to the controller 5.

When the patrol-read command specifying clst (ch.0, BNK0, PLN0, +2) has been received from the controller 5, the peripheral circuit 61-0 uses the data stored in the cache 611-0 to output data for one cluster that corresponds to clst (ch.0, BNK0, PLN0, +2), to the controller 5. Specifically, by the controller 5 executing the data read cycle (Dout), the data for one cluster that corresponds to clst (ch.0, BNK0, PLN0, +2) is transferred from the cache 611-0 of the die #0 to the controller 5.

When the patrol-read command specifying clst (ch.0, BNK0, PLN0, +3) has been received from the controller 5, the peripheral circuit 61-0 uses the data stored in the cache 611-0 to output data for one cluster that corresponds to clst (ch.0, BNK0, PLN0, +3), to the controller 5. Specifically, by the controller 5 executing the data read cycle (Dout), the data for one cluster that corresponds to clst (ch.0, BNK0, PLN0, +3) is transferred from the cache 611-0 of the die #0 to the controller 5.

Thus, the controller 5 consecutively reads, from the die #0 through the channel ch.0, four pieces of data each stored in four memory locations included in the physical page P1 of the physical block BLK5 included in the plane PLN0 of the die #0, and each having a size corresponding to one cluster. The time required to read the data for these four clusters is tR×1+Dout×4. Here, tR is the time required to read data from a memory cell array to a page buffer. Dout is the time required for the data output cycle for transferring data for one cluster from the die to the controller 5.

Next, the controller 5 issues a patrol-read command specifying clst (ch.0, BNK0, PLN1, +0), a patrol-read command specifying clst (ch.0, BNK0, PLN1, +1), a patrol-read command specifying clst (ch.0, BNK0, PLN1, +2), and a patrol-read command specifying clst (ch.0, BNK0, PLN1, +3) as a group of the patrol-read commands (patrol-read command group R2). The controller 5 stores the patrol-read command group R2 in the patrol-read command queue 706. The four patrol-read commands included in the patrol-read command group R2 stored in the patrol-read command queue 706 are transmitted one by one to the die #0 by the NAND controller 531-0. Therefore, the same data read operation as in the case where the patrol-read command group R1 is issued is executed.

Note that, a multi-plane read mode for simultaneously reading data from the plane PLN0 and the plane PLN1 may be used to simultaneously (parallelly) execute reading data for one physical page from the physical page of the plane PLN0 to the page buffer of the peripheral circuit 61-0 and reading data for one physical page from the physical page of the plane PLN1 to the page buffer of the peripheral circuit 61-1. The controller 5 may also simultaneously generate the patrol-read command group R1 and the patrol-read command group R2, and store the patrol-read command group R1 and the patrol-read command group R2 in the patrol-read command queue 706 at the same timing.

Next, the controller 5 consecutively reads, from the die #1 through the channel ch.1, four pieces of data each stored in four memory locations included in the physical page P1 of the physical block BLK5 included in the plane PLN0 of the die (ch1, BNK0), that is, the die #1, and each having a size corresponding to one cluster.

In this case, the controller 5 issues a patrol-read command specifying clst (ch.1, BNK0, PLN0, +0), a patrol-read command specifying clst (ch.1, BNK0, PLN0, +1), a patrol-read command specifying clst (ch.1, BNK0, PLN0, +2), and a patrol-read command specifying clst (ch.1, BNK0, PLN0, +3) as a group of patrol-read commands (patrol-read command group R3).

Next, the controller 5 consecutively reads from the die #1 through the channel ch.1 four pieces of data each stored in four memory locations included in the physical page P1 of the physical block BLK5 included in the plane PLN1 of the die (ch1, BNK0), that is, the die #1, and each having a size corresponding to one cluster.

In this case, the controller 5 issues a patrol-read command specifying clst (ch.1, BNK0, PLN1, +0), a patrol-read command specifying clst (ch.1, BNK0, PLN1, +1), a patrol-read command specifying clst (ch.1, BNK0, PLN1, +2), and a patrol-read command specifying clst (ch.1, BNK0, PLN1, +3) as a group of patrol-read commands (patrol-read command group R4).

Then, when processing based on a patrol-read command specifying clst (ch.17, BNK0, PLN1, +3) is ended, the controller 5 executes the patrol-read operation for the bank BNK1 in the same manner as the patrol-read operation for the bank BNK0.

Thus, in the first mode of the patrol-read operation, the controller 5 issues a patrol-read command group so that the data stored in the cache can be effectively utilized. As a result, the controller 5 can reduce the number of accesses to the memory cell array by the peripheral circuitry, thereby reducing the amount of fluctuation of a threshold value of a memory cell due to read-disturbance, the time required for the patrol-read operations, and the power consumed by the memory system 3.

In the first mode of the patrol-read operation, four pieces of data stored in four memory locations included in a physical page of a die connected to one channel are read consecutively. However, in a case where a channel through which a read command specifying a memory location based on a host-read command is issued is the same as a channel through which a patrol-read command is issued, the latency of the host-read command will be affected. Specifically, the latency will increase by a maximum time of tR×1+Dout×4. It is also possible to execute the host-read processing with priority over the patrol-read operation. However, in this case, the time required for the patrol-read operation becomes longer since the contents of the cache of the peripheral circuit are changed by data read from another physical page on the basis of the host-read. The second mode of the patrol-read operation can reduce the impact on the latency of the host-read command.

Next, the second mode of the patrol-read operation is described. FIG. 7 illustrates the order of reading data in the second mode of the patrol-read operation executed in the memory system 3 according to the embodiment.

Here, a case in which the patrol-read operation is executed for a logical page (here, a logical page #1) of a target of the patrol-read operation is described.

In the second mode of the patrol-read operation, the controller 5 consecutively reads a piece of data that corresponds to a cluster from each of a plurality of physical pages in the logical page #1 that correspond to different plurality of channels in an order that overs the channels (the order shown vertically in FIG. 7). Since this reading order can reduce the time that each channel is occupied by the patrol-read operation, the increase in latency of the host-read operation can be suppressed.

First, the controller 5 issues a patrol-read command specifying clst (ch.0, BNK0, PLN0, +0), a patrol-read command specifying clst (ch.1, BNK0, PLN0, +0), a patrol-read command specifying clst (ch.2, BNK0, PLN0, +0), a patrol-read command specifying clst (ch.3, BNK0, PLN0, +0), a patrol-read command specifying clst (ch.4, BNK0, PLN0, +0), . . . , and a patrol-read command specifying clst (ch.17, BNK0, PLN0, +0) as a group of patrol-read commands (patrol-read command group R11). The controller 5 stores the patrol-read command group R11 in the patrol-read command queue 706. The 18 patrol-read commands included in the patrol-read command group R11 stored in the patrol-read command queue 706 are transmitted one by one to the planes PLN0 of the respective dies #0 to #17 by the NAND controllers 531-0 to 531-17.

In this way, the controller 5 reads, from the dies #0 to #17 through the channels ch.0 to ch.17, data for one cluster stored in the physical page P1 of the physical block BLK5 included in the plane PLN0 of the die #0, data for one cluster stored in the physical page P1 of the physical block BLK5 included in the plane PLN0 of the die #1, . . . , and the data for one cluster stored in the physical page P1 of the physical block BLK5 included in the plane PLN0 of the die #17, respectively.

In the second mode of the patrol-read operation, each time data for one cluster is read, tR+Dout time is required. Thus, for example, the time required to read data corresponding to one cluster is tR×1+Dout×1.

Note that the dies connected to the channels ch.0 to ch.17, respectively, can be operated in parallel. Therefore, even if a host-read operation that requires access to all channels occurs, all the channels can be used for the host-read operation after the time tR×1+Dout×1 elapses at maximum from this point of time. Therefore, the increase in latency of the host-read operation can be suppressed to tR×1+Dout×1 at maximum.

Next, the controller 5 issues a patrol-read command specifying clst (ch.0, BNK0, PLN0, +1), a patrol-read command specifying clst (ch.1, BNK0, PLN0, +1), a patrol-read command specifying clst (ch.2, BNK0, PLN0, +1), a patrol-read command specifying clst (ch.3, BNK0, PLN0, +1), a patrol-read command specifying clst (ch.4, BNK0, PLN0, +1), . . . , and a patrol-read command specifying clst (ch.17, BNK0, PLN0, +1) as a group of patrol-read commands (patrol-read command group R12).

Then, after completing processing of a patrol-read command group that specifies clst (ch.0, BNK0, PLN0, +3) to clst (ch.17, BNK0, PLN0, +3), the controller 5 issues a patrol-read command group that specifies clst (ch.0, BNK0, PLN1, +0) to clst (ch.17, BNK0, PLN1, +0). After completing processing of a patrol-read command group that specifies clst (ch.0, BNK0, PLN1, +3) to clst (ch.17, BNK0, PLN1, +3), the controller 5 issues a patrol-read command group that specifies clst (ch.0, BNK1, PLN0, +0) to clst (ch.17, BNK1, PLN0, +0).

Thus, in the second mode of the patrol-read operation, the controller 5 issues a plurality of patrol-read commands that can be processed in parallel as a group of the patrol-read commands (patrol-read command group). This allows the controller 5 to reduce the impact on latency of a host-read operation compared to the first mode of the patrol-read operation, even in a case where a host-read command has been received.

Thus, the first mode and the second mode each have different characteristics. Considering the characteristics of each of the first mode and the second mode, the controller 5 switches the mode of the patrol-read operation to be used according to the status of the memory system 3. Therefore, the controller 5 can suitably control the patrol-read operation. The timing of switching between the two modes is, for example, when a patrol-read command group is issued, when one logical page targeted for patrol-read operation is switched to another logical page upon completion of a patrol-read operation for the one logical page, or when the next patrol-read operation is started by the elapse of the first time period since the start of the previous patrol-read operation. In the case where the timing of switching between the two modes is when a patrol-read command group is issued, the controller 5 determines the status of the memory system 3 immediately before issuing the patrol-read command group. This allows the modes of the patrol-read operation to be switched finely on the basis of the current status of the memory system 3. In this case, the mode of the patrol-read operation to be used is dynamically switched while a patrol-read operation for one logical page is being executed. In the case where the timing of switching between the two modes is when a logical page targeted for reading is switched to another logical page, the mode of the patrol-read operation to be used is switched in a unit of a logical page. In the case where the timing of switching between the two modes is only when the next patrol-read operation is to be started, the mode of the patrol-read operation to be used is switched in a unit of the number of logical pages to be executed in one patrol-read operation.

Figure 8:
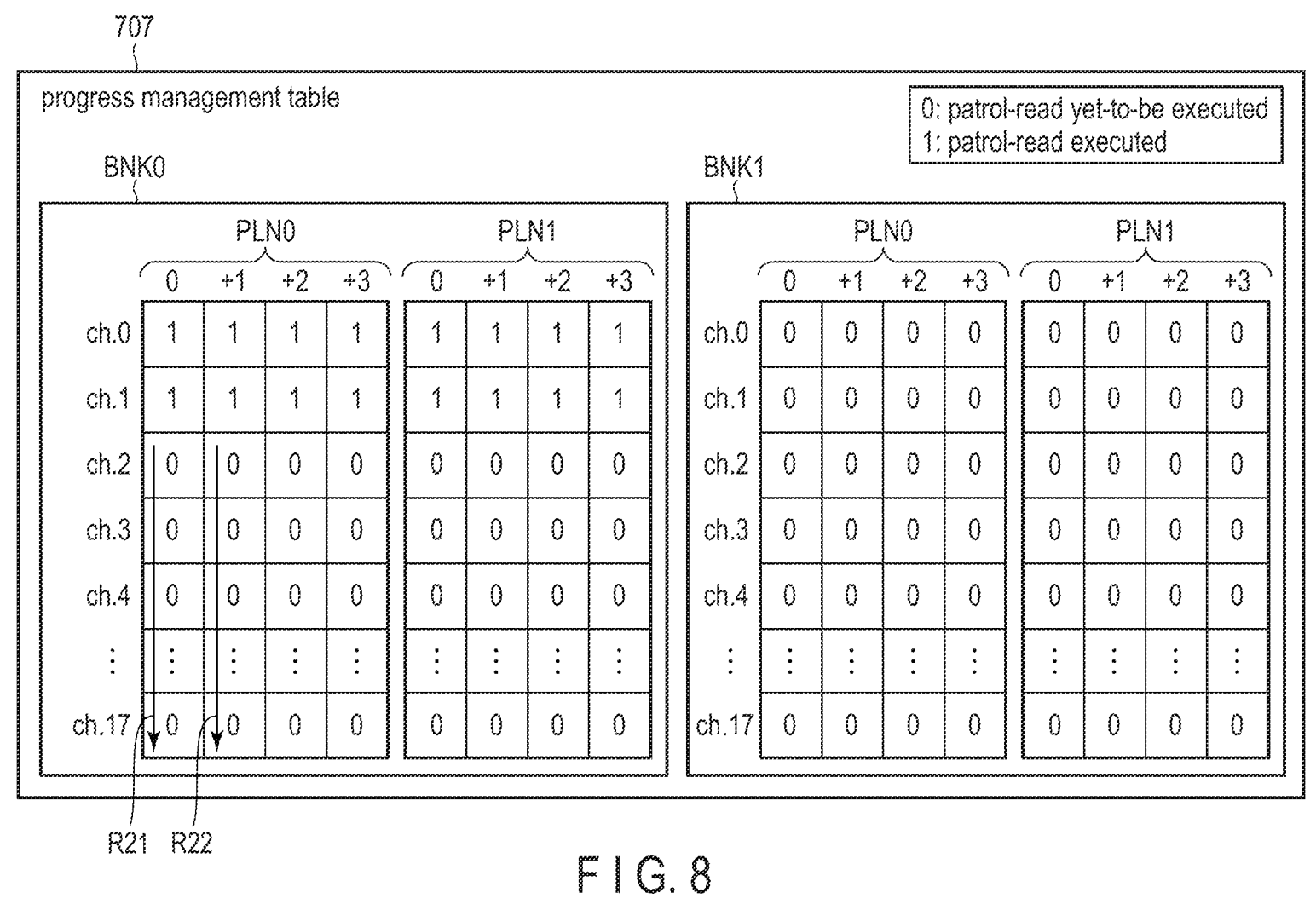

Next, a progress management of the patrol-read operation will be described. FIG. 8 illustrates an example of a configuration of the progress management table used in the memory system according to the embodiment.

In the case of switching the mode of the patrol-read operation when issuing a patrol-read command group, the controller 5 manages whether or not a patrol-read operation has already been executed for each of a plurality of memory locations included in a logical page targeted for patrol-read by using the progress management table 707.

When a logical page targeted for patrol-read has been selected, the controller 5 associates the progress management table 707 with the selected logical page. The progress management table 707 stores information indicating whether or not a patrol-read operation has been executed for each of the plurality of memory locations included in the associated logical page. This information is, for example, bitmap information in which one bit is assigned to each of the plurality of memory locations included in the logical page.

FIG. 8 illustrates an example of the progress management table 707 in a case where two patrol-read command groups corresponding to the first mode of the patrol-read operation have been issued. In FIG. 8, in the selected logical page, the patrol-read operation has been executed for four clusters clst (ch.0, BNK0, PLN0, +0) to clst (ch.0, BNK0, PLN0, +3) included in the physical page of the plane PLN0 of the die (ch.0, BNK0), four clusters clst (ch.0, BNK0, PLN1, +0) to clst (ch.0, BNK0, PLN1, +3) included in the physical page of the plane PLN1 of the die (ch.0, BNK0), four clusters clst (ch.1, BNK0, PLN0, +0) to clst (ch.1, BNK0, PLN0, +3) included in the physical page of the plane PLN0 of the die (ch.1, BNK0), and four clusters clst (ch.1, BNK0, PLN1, +0) to clst (ch.1, BNK0, PLN1, +3) included in the physical page of the plane PLN1 of the die (ch.1, BNK0). One bit corresponding to each of these memory locations is set to a value (e.g., "1") indicating that the patrol-read operation has been executed. Also, a bit corresponding to each of the other memory locations is set to a value (e.g., "0") indicating that the patrol-read operation has not been executed.

Subsequently, in a case where the mode of the patrol-read operation is switched to the second mode, the controller 5 refers to the progress management table 707 and, on the basis of the reference result, identifies clusters for which the first mode of the patrol-read operation has been executed, that is, memory locations from which data has been read by the first mode of the patrol-read operation among the plurality of memory locations included in the logical page targeted for patrol-read. Then, the controller 5 reads data from each of the remaining memory locations, excluding the identified memory locations among the plurality of memory locations included in the logical page by the second mode of the patrol-read operation.

Specifically, the controller 5 refers to the progress management table 707 and, on the basis of the reference result, determines that the patrol-read operation has already been executed for the clusters clst (ch.0, BNK0, PLN0, +0) and clst (ch.1, BNK0, PLN0, +0). Therefore, the controller 5 issues 16 patrol-read commands that specify clst (ch.2, BNK0, PLN0, +0), clst (ch.3, BNK0, PLN0, +0), clst (ch.4, BNK0, PLN0, +0), . . . , and clst (ch.17, BNK0, PLN0, +0), respectively, as a patrol-read command group R21.

When processing of these 16 patrol-read commands is completed, the controller 5 refers to the progress management table 707 and, on the basis of the reference result, determines that the patrol-read operation has already been executed for the clusters clst (ch.0, BNK0, PLN0, +1) and clst (ch.1, BNK0, PLN0, +1). Therefore, the controller 5 issues 16 patrol-read commands that specify clst (ch.2, BNK0, PLN0, +1), clst (ch.3, BNK0, PLN0, +1), clst (ch.4, BNK0, PLN0, +1), . . . , and clst (ch.17, BNK0, PLN0, +1), respectively, as a patrol-read command group R22.

Next, a procedure for selecting a mode of the patrol-read operation on the basis of whether or not a received and uncompleted host-read command exists will be described. FIG. 9 is a flowchart illustrating a first procedure of the patrol-read operation executed in the memory system 3 according to the embodiment. The controller 5 starts the patrol-read operation every time the first time period elapses.

First, the controller 5 determines whether or not processing of issued patrol-read commands has been completed (S101). The issued patrol-read commands are all patrol-read commands included in a patrol-read command group that has already been issued in the patrol-read operation that has been started.

In a case where the processing of the issued patrol-read commands has not been completed, that is, in a case where the issued patrol-read command group includes one or more patrol-read commands for which processing has not been completed (No in S101), the controller 5 waits until processing of all the issued patrol-read commands is completed.

In a case where the processing of all the issued patrol-read commands is completed (Yes in S101), the controller 5 determines whether or not a host-read command has been detected (S102). For example, the controller 5 refers to the value of a flag managed by the host-read command detection unit 524 and, on the basis of the reference result, determines whether or not a received and uncompleted host-read command exists.

In a case where the received and uncompleted host-read command does not exist (No in S102), the controller 5 selects the first mode as the mode of the patrol-read operation (S103).

In a case where the received and uncompleted host-read command exists (Yes in S102), the controller 5 selects the second mode as the mode of the patrol-read operation (S104). The second mode is a mode that can reduce the impact on the latency of processing the host-read command.

The controller 5 refers to the progress management table 707 and generates patrol-read commands corresponding to the selected mode (S105). In this case, the controller 5 generates, as a patrol-read command group, a plurality of patrol-read commands for continuously reading data in an order corresponding to the selected mode and for skipping reading from clusters in the logical page that have been read.

The controller 5 issues each of the patrol-read commands generated in S105 to the NAND memory 6 through the NAND interface 53 (S106). In this case, the controller 5 stores each of the generated patrol-read commands in the patrol-read command queue 706. The patrol-read commands stored in the patrol-read command queue 706 are transmitted to the NAND memory 6 by the NAND interface 53.

The controller 5 updates the progress management table 707 in a manner that indicates that the patrol-read operation for memory locations specified by the issued patrol-read commands have been executed (S107). The controller 5 may, for example, update the progress management table 707 after the patrol-read commands issued in S105 are processed.

The controller 5 determines whether or not all patrol-read commands to be issued in the current patrol-read operation have been issued (S108). The number of the patrol-read commands to be issued in the current patrol-read operation is expressed, for example, by a product of the number of logical pages for which read operations are to be executed in one patrol-read operation and the number of clusters per logical page.

In a case where all the patrol-read commands to be issued in the current patrol-read operation have been issued, that is, in a case where the number of logical pages for which read operations are executed in the current patrol-read operation reaches the number of logical pages for which read operations are to be executed in one patrol-read operation (Yes in S108), the controller 5 ends the current patrol-read operation.

In a case where there are one or more unissued patrol-read commands, that is, in a case where the number of logical pages for which read operations are executed in the current patrol-read operation has not reached the number of logical pages for which read operations are to be executed in one patrol-read operation (No in S108), the controller 5 continues the patrol-read operation from S101.

Next, a procedure for selecting the mode of the patrol-read operation depending on whether the memory system 3 is in the sleep state or not will be described. FIG. 10 is a flowchart illustrating a second procedure of the patrol-read operation executed in the memory system 3 according to the present embodiment. The controller 5 starts the patrol-read operation every time the first time period elapses.

First, the controller 5 determines whether or not processing of issued patrol-read commands has been completed (S201). The processing of S201 is the same as the processing of S101 described in FIG. 9.

In a case where the processing of the issued patrol-read commands has not been completed (No in S201), the controller 5 waits until the processing of all the issued patrol-read commands is completed.

In a case where the processing of all the issued patrol-read commands is completed (Yes in S201), the controller 5 determines whether or not the memory system 3 is in the sleep state (S202).

In a case where the memory system 3 is in the sleep state (Yes in S202), the controller 5 selects the first mode as the mode of the patrol-read operation (S203).

In a case where the memory system 3 is not in the sleep state, that is, in a case where the memory system 3 is in the normal state (No in S202), the controller 5 selects the second mode as the mode of the patrol-read operation (S204).

Since the processing from S205 to S208 is the same as the processing from S105 to S108 described in FIG. 9, descriptions will be omitted.

Thus, in the case where the memory system 3 is in the sleep state, the controller 5 recognizes that a host-read command that has been received and uncompleted does not exist. Therefore, by selecting the first mode and executing the patrol-read operation, the time required to execute the patrol-read operation and the power consumption can be reduced.

Figure 11:
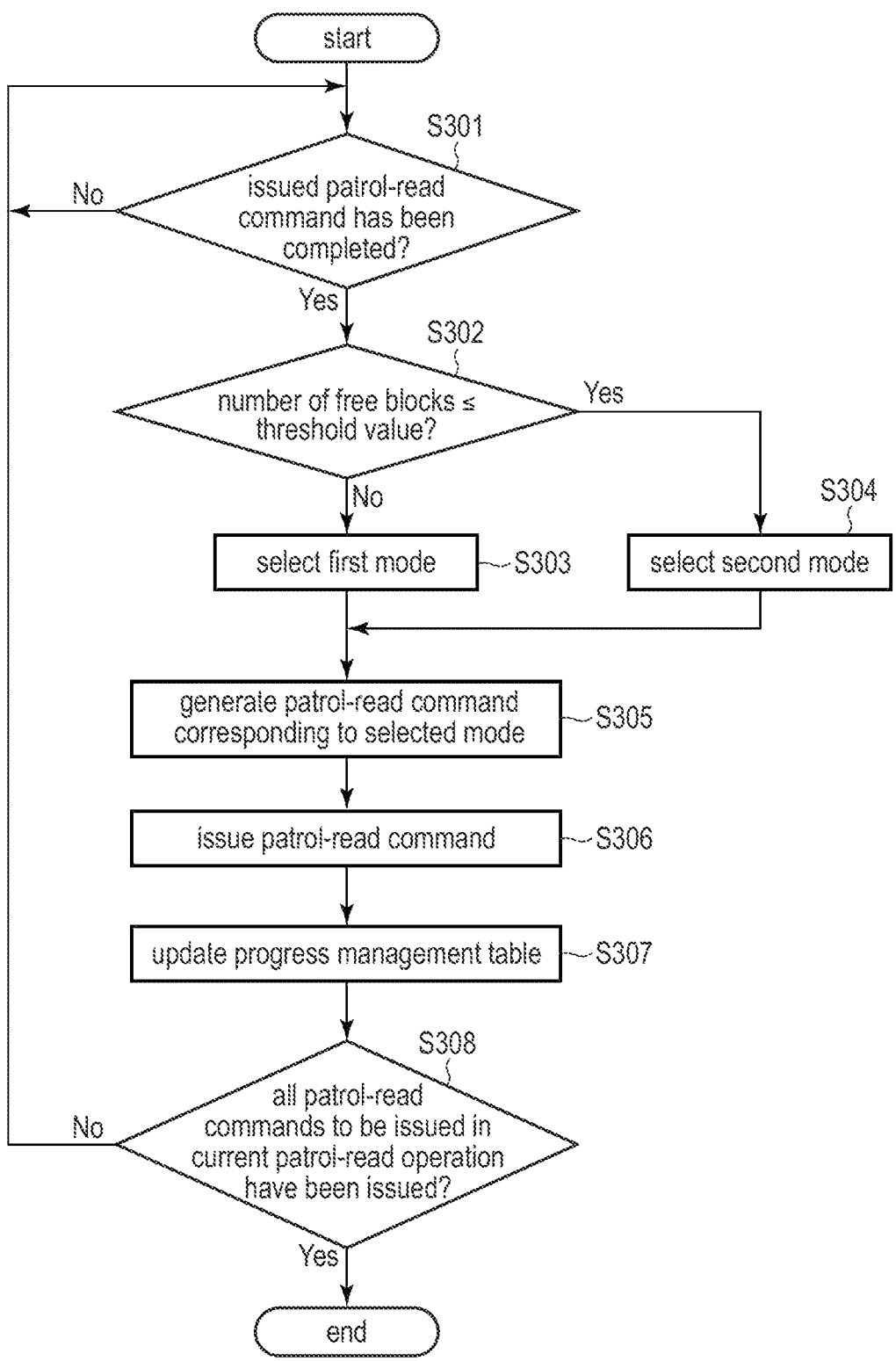
FIG. 11 is a flowchart illustrating a third procedure of the patrol-read operation executed in the memory system according to the embodiment.

Next, a procedure for selecting the mode of the patrol-read operation depending on whether or not it is necessary to execute the GC operation will be described. FIG. 11 is a flowchart illustrating a third procedure of the patrol-read operation executed in the memory system 3 according to the embodiment. The controller 5 starts the patrol-read operation every time the first time period elapses.

First, the controller 5 determines whether or not processing of issued patrol-read commands has been completed (S301). The processing of S301 is the same as the processing of S101 described in FIG. 9.

In a case where the processing of the issued patrol-read command has not been completed (No in S301), the controller 5 waits until the processing of all the issued patrol-read commands is completed.

In a case where the processing of all the issued patrol-read commands is completed (Yes in S301), the controller 5 refers to the free block list 710 and, on the basis of the reference result, determines whether or not the number of free blocks is equal to or below a threshold value (S302).

In a case where the number of free blocks exceeds the threshold value (No in S302), the controller 5 determines that there is no need to execute the GC operation and selects the first mode as the mode of the patrol-read operation (S303).

In a case where the number of free blocks is equal to or below the threshold value (Yes in S302), the controller 5 determines that the GC operation needs to be executed and selects the second mode as the mode of the patrol-read operation (S304).

Since the processing from S305 to S308 is the same as the processing from S105 to S108 described in FIG. 9, descriptions will be omitted.

Therefore, in the case where it is necessary to execute the GC operation, the controller 5 can select the second mode and execute the patrol-read operation to reduce the impact on the latency of processing a read command issued based on the GC operation. As a result, it is possible to prevent a situation where the number of required free blocks becomes insufficient due to the influence of the patrol-read operation. Note that, in a case where the number of free blocks exceeds the threshold value, and a received and uncompleted host-read command does not exist, the first mode may be selected. In a case where the number of free blocks is equal to or below the threshold value or the received and uncompleted host-read command exists, the second mode may be selected. This effectively reduces the impact on both a host-read operation and a read operation in the GC operation.

Figure 12:
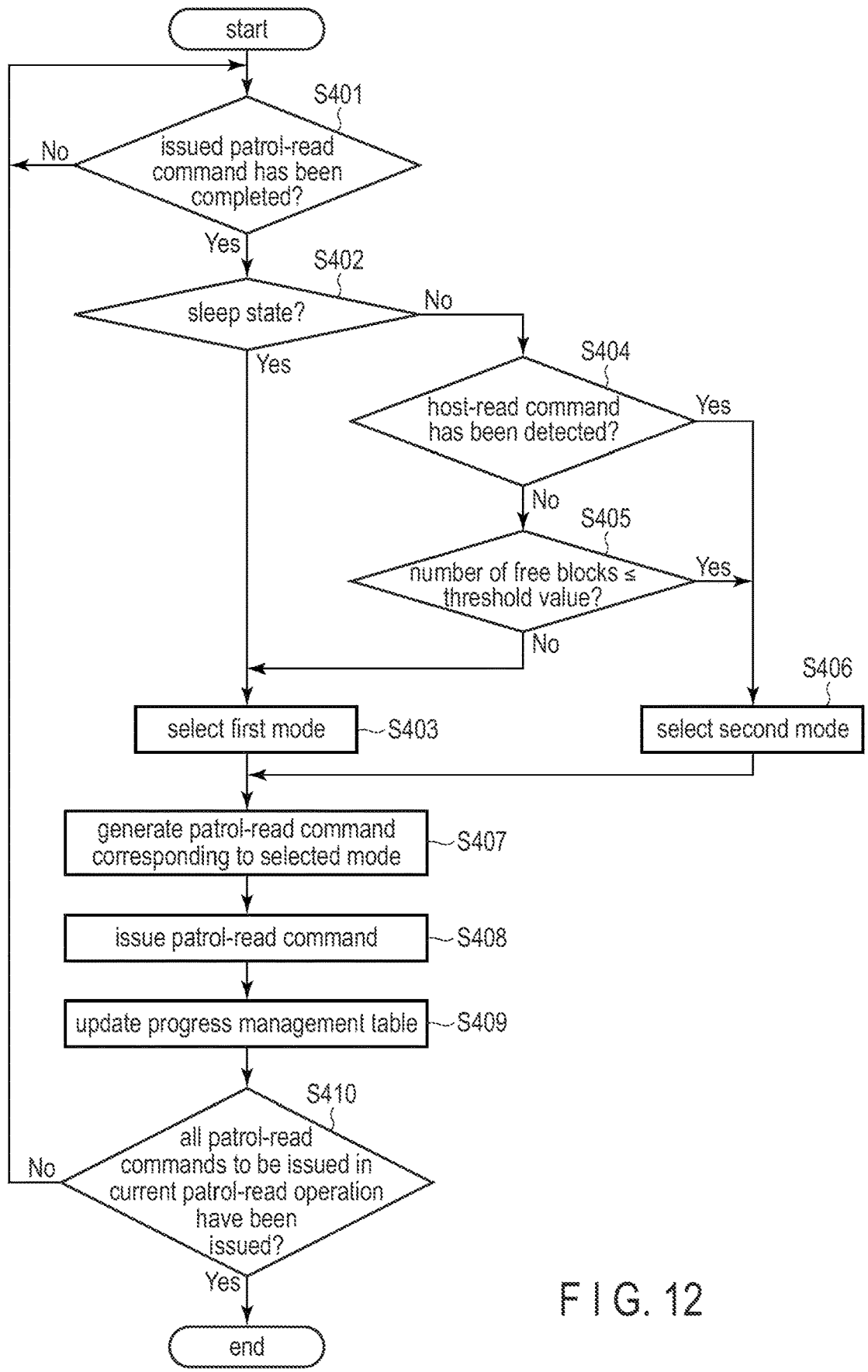
FIG. 12 is a flowchart illustrating a fourth procedure of the patrol-read operation executed in the memory system according to the embodiment.

Next, the procedure for selecting the mode of the patrol-read operation will be described depending on whether or not a received and uncompleted host-read command exists, whether or not the memory system 3 is in the sleep state, and whether or not it is necessary to perform the GC operation. FIG. 12 is a flowchart illustrating a fourth procedure of the patrol-read operation executed in the memory system 3 according to the embodiment. The controller 5 starts the patrol-read operation every time the first time period elapses.

First, the controller 5 determines whether or not processing of issued patrol-read commands has been completed (S401). The processing of S401 is the same as the processing of S101 described in FIG. 9.

In a case where the processing of the issued patrol-read commands has not been completed (No in S401), the controller 5 waits until the processing of the issued patrol-read commands is completed.

In a case where the processing of all the issued patrol-read commands is completed (Yes in S401), the controller 5 determines whether or not the memory system 3 is in the sleep state (S402). The processing of S402 is the same as the processing of S202 described in FIG. 10.

In a case where the memory system 3 is in the sleep state (Yes in S402), the controller 5 selects the first mode as the mode of the patrol-read operation (S403).

In a case where the memory system 3 is not in the sleep state (No in S402), the controller 5 determines whether or not a host-read command has been detected, that is, whether or not a received and uncompleted host-read command exists (S404). The processing of S404 is the same as the processing of S102 described in FIG. 9.

In a case where the received and uncompleted host-read command does not exist (No in S404), the controller 5 refers to the free block list 710 and, on the basis of the reference result, determines whether or not the number of free blocks is equal to or below a threshold value (S405). The processing of S405 is the same as the processing of S302 in FIG. 11.

In a case where the received and uncompleted host-read command exists (Yes in S404), or in a case where the number of free blocks is equal to or below the threshold value (Yes in S405), the controller 5 selects the second mode as the mode of the patrol-read operation (S406).

In a case where the received and uncompleted host-read command does not exist (No in S404), and the number of free blocks exceeds the threshold value (No in S405), the controller 5 selects the first mode as the mode of the patrol-read operation (S403).

Since the processing from S407 to S410 is the same as the processing from S105 to S108 described in FIG. 9, descriptions will be omitted.

Thus, the controller 5 can use the three conditions described in FIG. 9 to FIG. 11 to select the patrol-read mode (i.e., the mode of the patrol-read mode). The controller 5 may also use any two of the three conditions to select the patrol-read mode.

In the following, an example of a case in which the patrol-read mode is selected on the basis of whether or not a received and uncompleted host-read command exists will be described. However, the patrol-read mode may also be determined using other conditions instead.

Next, a procedure for selecting the patrol operation mode each time one logical page targeted for patrol-read is switched to another logical page in accordance with completion of the patrol-read operation for the one logical page is described. FIG. 13 is a flowchart illustrating a fifth procedure of the patrol-read operation executed in the memory system 3 according to the embodiment. The controller 5 starts the patrol-read operation every time the first time period elapses. The processing from S501 to S508 shown in FIG. 13 is the same as the processing from S101 to S108 described in FIG. 9.

First, the controller 5 determines whether or not processing of issued patrol-read commands has been completed (S501).

In a case where the processing of the issued patrol-read commands has not been completed (No in S501), the controller 5 waits until the processing of all the issued patrol-read commands is completed.

In a case where the processing of all the issued patrol-read commands is completed (Yes in S501), the controller 5 determines whether or not a host-read command has been detected (S502).

In a case where a received and uncompleted host-read command does not exist (No in S502), the controller 5 selects the first mode as the mode of the patrol-read operation (S503).

In a case where the received and uncompleted host-read command exists (Yes in S502), the controller 5 selects the second mode as the mode of the patrol-read operation (S504).

The controller 5 refers to the progress management table 707 and generates a plurality of patrol-read commands corresponding to the selected mode (S505).

The controller 5 issues each of the patrol-read commands generated in S505 to the NAND memory 6 through the NAND interface 53 (S506).

The controller 5 updates the progress management table 707 in a manner that indicates that the patrol-read operation has been executed for memory locations specified by the issued patrol-read commands (S507).

The controller 5 determines whether or not all patrol-read commands to be issued in the current patrol-read operation have been issued (S508).

In a case where all the patrol-read commands to be issued in the current patrol-read operation have been issued, that is, in a case where the number of logical pages for which read operations have been executed in the current patrol-read operation reaches the number of logical pages for which read operations are to be executed in one patrol-read operation (Yes in S508), the controller 5 ends the current patrol-read operation.

In a case where the number of logical pages for which read operations are executed in the current patrol-read operation has not reached the number of logical pages for which read operations are to be executed in one patrol-read operation (No in S508), the controller 5 refers to the progress management table 707 and, on the basis of the reference result, determines whether or not the patrol-read operation for the logical page targeted for patrol-read has been completed (S509).

In a case where the patrol-read operation for the logical page targeted for patrol-read has not been completed (No in S509), the controller 5 determines whether or not the processing of the issued patrol-read commands has been completed (S510).

In a case where the processing of the issued patrol-read command has not been completed (No in S510), the controller 5 waits until the processing of the issued patrol-read commands is completed.

In a case where the processing of the issued patrol-read commands is completed (Yes in S510), the controller 5 generates patrol-read commands corresponding to the mode that is already selected (S505) and continues the patrol-read operation for the logical page targeted for patrol-read.

In a case where the patrol-read operation for the logical page targeted for patrol-read is completed (Yes in S509), the controller 5 selects a new logical page targeted for patrol-read (S511), selects the mode of the patrol-read operation again (S501 to S504), and continues the patrol-read operation.

Thus, the controller 5 switches the mode of the patrol-read operation each time one logical page targeted for patrol-read is switched to another logical page in accordance with completion of the patrol-read operation for the one logical page, on the basis of the status of the memory system 3. In this case, since the mode of the patrol-read operation is not switched while the patrol-read operation is executed for the same logical page, the progress management of the patrol-read operation can be easily performed.

Figure 14:
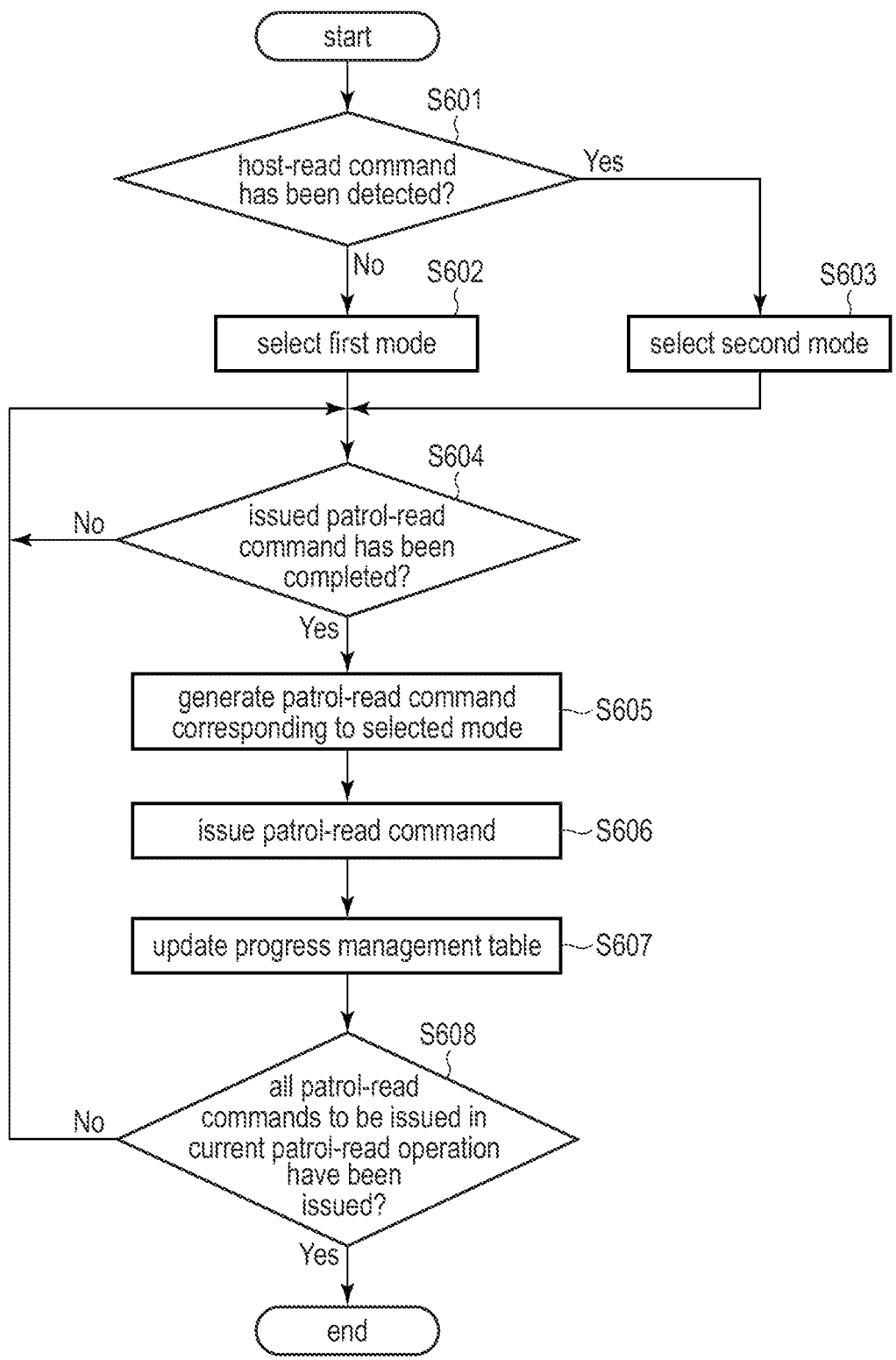
FIG. 14 is a flowchart illustrating a sixth procedure of the patrol-read operation executed in the memory system according to the embodiment.

Next, a case in which the mode of the patrol-read operation is selected each time the patrol-read operation is started will be described. FIG. 14 is a flowchart illustrating a sixth procedure of the patrol-read operation executed in the memory system 3 according to the embodiment. The controller 5 starts the patrol-read operation every time the first time period elapses. The processing from S601 to S608 shown in FIG. 14 is the same as the processing of S102 to S104, S101, and S105 to S108 described in FIG. 9.

First, the controller 5 determines whether or not a host-read command has been detected, that is, whether or not a received and uncompleted host-read command exists (S601).

In a case where the received and uncompleted host-read command does not exist (No in S601), the controller 5 selects the first mode as the mode of the patrol-read operation (S602).

In a case where the received and uncompleted host-read command exists (Yes in S601), the controller 5 selects the second mode as the mode of the patrol-read operation (S603).

The controller 5 determines whether or not processing of issued patrol-read commands has been completed (S604).

In a case where the processing of the issued patrol-read commands has not been completed (No in S604), the controller 5 waits until the processing of all the issued patrol-read commands is completed.

In a case where the processing of all the issued patrol-read commands is completed (Yes in S604), the controller 5 refers to the progress management table 707 and generates patrol-read commands corresponding to the selected mode (S605).

The controller 5 issues each of the patrol-read commands generated in S605 to the NAND memory 6 through the NAND interface 53 (S606).

The controller 5 updates the progress management table 707 in a manner that indicates that the patrol-read operation for memory locations that are specified by the issued patrol-read commands have been executed (S607).

The controller 5 determines whether or not all patrol-read commands to be issued in the current patrol-read operation have been issued (S608).

In a case where all the patrol-read commands to be issued in the current patrol-read operation have been issued, that is, in a case where the number of logical pages for which read operations have been executed in the current patrol-read operation reaches the number of logical pages for which read operations are to be executed in one patrol-read operation (Yes in S608), the controller 5 ends the current patrol-read operation.

In a case where all the patrol-read commands to be issued in the current patrol-read operation have not been issued (No in S608), the controller 5 continues the processing of S604 to S607 by using the mode selected in S601 to S603.

As explained above, according to the present embodiment, the mode of the patrol-read operation is selected in consideration of the status of the memory system 3.

In a case where a received and uncompleted host-read command does not exist, the controller 5 need not to consider the impact on latency of processing a host-read command. Therefore, the controller 5 executes the first mode of the patrol-read operation. By executing the first mode of the patrol-read operation, the controller 5 reduces the number of accesses to the memory cell array by the peripheral circuits, thereby reducing the time required for the patrol-read operation and the power consumed by the memory system 3.

In addition, in a case where a received and uncompleted host-read command exists, the controller 5 considers the impact on the latency of processing a host-read command. At this time, the controller 5 executes the second mode of the patrol-read operation. By executing the second mode of the patrol-read operation, the controller 5 can minimize the increase in the latency of processing a host-read command.

The timing at which the controller 5 selects the mode of the patrol-read operation may be when a patrol-read command group is issued, when a logical page targeted for patrol-read is selected, or when the patrol-read operation is started.

By selecting the mode of the patrol-read operation when the patrol-read command group is issued, the controller 5 can switch the mode of the patrol-read operation more finely than at other timings. In this case, it is assumed that the mode of the patrol-read operation is switched while the patrol-read operation for one logical page is being executed. Since the controller 5 manages information indicating whether or not the patrol operation has already been executed for each of clusters included in the logical page, the clusters that have already been read in the previous patrol operation can be skipped, and a patrol-read operation for each of clusters that follow the clusters that have already been read can be executed in the switched mode.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system that is connectable to a host, the memory system comprising:
   a nonvolatile memory that includes a first die and a second die, the first die being connected to a first channel, the second die being connected to a second channel different from the first channel; and
   a controller configured to periodically execute a first operation that includes an operation of reading data written in the nonvolatile memory and an operation of determining whether or not a number of errors included in the read data is equal to or greater than a threshold value, wherein
   each of the first die and the second die includes a plurality of physical blocks, and each of the plurality of physical blocks includes a plurality of physical pages, wherein the controller is configured to:
   determine whether or not a read request for which processing has not been completed after the read request is received from the host exists, in the first operation;
   select a first mode for the first operation in a case where the read request does not exist, and select a second mode for the first operation in a case where the read request exists;
   in a case where the first mode is selected, issue a first read command group including read commands that specify respective contiguous memory locations that are included in a first physical page or a second physical page, and read pieces of data that are stored in the contiguous memory locations, respectively, the first physical page being included in a first physical block of the first die, and the second physical page being included in a second physical block of the second die; and
   in a case where the second mode is selected, issue a second read command group including a read command that specifies one memory location of the memory locations in the first physical page, and a read command that specifies one memory location of the memory locations in the second physical page, and read first data stored in the one memory location of the first physical page and second data stored in the one memory location of the second physical page.

2. The memory system of claim 1, wherein the controller is further configured to:
   manage management information that indicates each of memory locations from which data has been read by the first operation among the memory locations of the first physical page and the memory locations of the second physical page; and
   in a case where a mode for the first operation is switched from one of the first mode and the second mode to another of the first mode and the second mode while the first operation for the first physical page and the second physical page is being executed, read data in the other of the modes from each remaining memory location excluding memory locations from which data has already been read in the one of the modes, among the memory locations of the first physical page and the memory locations of the second physical page, based on the management information.

3. The memory system of claim 1, wherein the controller is further configured to:
   in a case where no command is received from the host continuously for a first threshold time or more, transition the memory system to a sleep state in which operations other than the first operation are suspended;
   determine whether or not the memory system is in the sleep state before executing the first operation; and
   in a case where the memory system is in the sleep state, execute the first operation in the first mode.

4. The memory system of claim 3, wherein the controller is further configured to:
   in a case where the memory system in the sleep state has received a command from the host, transition the memory system from the sleep state to a state different from the sleep state;
   determine whether or not the memory system is in the state different from the sleep state before executing the first operation; and
   in a case where the memory system is in the state different from the sleep state, execute the first operation in the second mode.

5. The memory system of claim 1, wherein the controller is further configured to:
   in a case where a number of free blocks is equal to or below a second threshold value, execute a garbage collection operation;
   in a case where the read request for which processing has not been completed after the read command has been received from the host does not exist, and the number of free blocks exceeds the second threshold value, execute the first operation in the first mode; and in a case where the read request for which processing has not been completed after the read request has been received from the host exists, or the number of free blocks is equal to or below the second threshold value, execute the first operation in the second mode.

6. The memory system of claim 1, wherein the controller is further configured to:

manage logical blocks and logical pages included in each of the logical blocks, each of the logical blocks includes a set of physical blocks that are included in different dies from each other, each of the logical pages includes a same number of physical pages as a number of the physical blocks included in one logical block, the first physical block of the first die and the second physical block of the second die are included in a first logical block of the logical blocks, the first physical page and the second physical page are included in a first logical page of logical pages included in the first logical block, and the controller is configured to, in a case where the first logical page is selected as a logical page of a read target, read pieces of data stored in memory locations that are included in the first logical page by using the first mode or the second mode.

7. The memory system of claim 6, wherein the first die includes a first plane and a second plane, the first plane including physical blocks that include the first physical block, the second plane including physical blocks, the second die includes a third plane and a fourth plane, the third plane including physical blocks that include the second physical block, the fourth plane including physical blocks, the first logical block includes the first physical block of the first plane, a third physical block of the second plane, the second physical block of the third plane, and a fourth physical block of the fourth plane, and the first logical page includes the first physical page of the first physical block, the second physical page of the second physical block, a third physical page of the third physical block, and a fourth physical page of the fourth physical block.

8. The memory system of claim 6, wherein the nonvolatile memory further includes a third die and a fourth die, the third die being connected to the first channel, the fourth die being connected to the second channel, the first logical block includes the first physical block of the first die, the second physical block of the second die, a third physical block of the third die, and a fourth physical block of the fourth die, and the first logical page includes the first physical page of the first physical block, the second physical page of the second physical block, a third physical page of the third physical block, and a fourth physical page of the fourth physical block.

9. A method of controlling a memory system comprising a nonvolatile memory that includes a first die connected to a first channel and a second die connected to a second channel, each of the first die and the second die including a plurality of physical blocks, the plurality of physical blocks each including a plurality of physical pages, the method comprising:

periodically executing a first operation that includes an operation of reading data written in the nonvolatile memory and an operation of determining whether or not a number of errors in the read data is greater than or equal to a threshold value;

determining, in the first operation, whether or not a read request for which processing has not been completed after the read request is received from the host exists;

selecting a first mode for the first operation in a case where the read request does not exist;

selecting a second mode for the first operation in a case where the read request exists;

in a case where the first mode is selected, issuing a first read command group including read commands that specify respective contiguous memory locations that are included in a first physical page or a second physical page, and reading pieces of data that are stored in the contiguous memory locations, respectively, the first physical page being included in a first physical block of the first die, and the second physical page being included in a second physical block of the second die; and in a case where the second mode is selected, issuing a second read command group including a read command that specifies one memory location of the memory locations in the first physical page, and a read command that specifies one memory location of the memory locations in the second physical page, and reading first data stored in the one memory location of the first physical page and second data stored in the one memory location of the second physical page.

10. The method of claim 9, further comprising:

managing management information that indicates each of memory locations from which data has been read by the first operation among the memory locations of the first physical page and the memory locations of the second physical page; and in a case where a mode for the first operation is switched from one of the first mode and the second mode to another of the first mode and the second mode while the first operation for the first physical page and the second physical page is being executed, reading data in the other of the modes from each remaining memory location excluding memory locations from which data has already been read in the one of the modes, among the memory locations of the first physical page and the memory locations of the second physical page, based on the management information.

11. The method of claim 9, further comprising:

in a case where no command is received from the host continuously for a first threshold time or more, transitioning the memory system to a sleep state in which operations other than the first operation are suspended;

determining whether or not the memory system is in the sleep state before executing the first operation; and in a case where the memory system is in the sleep state, executing the first operation in the first mode.

12. The method of claim 11, further comprising:

in a case where the memory system in the sleep state has received a command from the host, transitioning the memory system from the sleep state to a state different from the sleep state;

determining whether or not the memory system is in the state different from the sleep state before executing the first operation; and in a case where the memory system is in the state different from the sleep state, executing the first operation in the second mode.

13. The method of claim 9, further comprising:

in a case where a number of free blocks is equal to or below a second threshold value, executing a garbage collection operation;

in a case where the read request for which processing has not been completed after the read command has been received from the host does not exist, and the number of free blocks exceeds the second threshold value, executing the first operation in the first mode; and in a case where the read request for which processing has not been completed after the read request has been received from the host exists, or the number of free blocks is equal to or below the second threshold value, executing the first operation in the second mode.

14. The method of claim 9, further comprising managing logical blocks and logical pages included in each of the logical blocks, wherein each of the logical blocks includes a set of physical blocks that are included in different dies from each other, each of the logical pages includes a same number of physical pages as a number of the physical blocks included in one logical block, the first physical block of the first die and the second physical block of the second die are included in a first logical block of the logical blocks, the first physical page and the second physical page are included in a first logical page of logical pages included in the first logical block, and the method further comprises, in a case where the first logical page is selected as a logical page of a read target, reading pieces of data stored in memory locations that are included in the first logical page by using the first mode or the second mode.

15. The method of claim 14, wherein the first die includes a first plane and a second plane, the first plane including physical blocks that include the first physical block, and the second plane including physical blocks, the second die includes a third plane and fourth plane, the third plane including physical blocks that include the second physical block, the fourth plane including physical blocks, the first logical block includes the first physical block of the first plane, a third physical block of the second plane, the second physical block of the third plane, and a fourth physical block of the fourth plane, and the first logical page includes the first physical page of the first physical block, the second physical page of the second physical block, a third physical page of the third physical block, and a fourth physical page of the fourth physical block.

16. The method of claim 14, wherein the nonvolatile memory further includes a third die and a fourth die, the third die being connected to the first channel, the fourth die being connected to the second channel, the first logical block includes the first physical block of the first die, the second physical block of the second die, a third physical block of the third die, and a fourth physical block of the fourth die, and the first logical page includes the first physical page of the first physical block, the second physical page of the second physical block, a third physical page of the third physical block and a fourth physical page of the fourth physical block.

* * * * *